(12) United States Patent
Maezawa et al.

(10) Patent No.: US 7,833,446 B2
(45) Date of Patent: Nov. 16, 2010

(54) METHOD OF MANUFACTURING AGGREGATED PARTICLES

(75) Inventors: Nobuhiro Maezawa, Yamatokoriyama (JP); Katsuru Matsumoto, Nara (JP); Keiichi Kikawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 545 days.

(21) Appl. No.: 11/882,372

(22) Filed: Aug. 1, 2007

(65) Prior Publication Data

US 2008/0029924 A1 Feb. 7, 2008

(30) Foreign Application Priority Data

Aug. 1, 2006 (JP) .............................. P2006-210316

(51) Int. Cl.
*G03G 9/08* (2006.01)
(52) U.S. Cl. ............... 264/117; 23/313 R; 430/137.14; 430/137.18
(58) Field of Classification Search ................. None
See application file for complete search history.

(56) References Cited

U.S. PATENT DOCUMENTS

| | | | |
|---|---|---|---|
| 5,424,162 A | 6/1995 | Kohri et al. | |
| 5,843,614 A | 12/1998 | Shinzo et al. | |
| 5,885,743 A | 3/1999 | Takayanagi et al. | |
| 6,017,670 A | 1/2000 | Hashizume et al. | |
| 6,270,708 B1 * | 8/2001 | Gurol | 264/117 |
| 7,284,899 B2 | 10/2007 | Nakano | |
| 7,402,371 B2 | 7/2008 | Sacripante et al. | |
| 2002/0042014 A1 | 4/2002 | Fujino et al. | |
| 2002/0160289 A1 | 10/2002 | Teshima et al. | |
| 2004/0110078 A1 | 6/2004 | Teshima et al. | |
| 2005/0041523 A1 | 2/2005 | Nakano | |
| 2006/0160012 A1 * | 7/2006 | Hirose et al. | 430/137.14 |
| 2007/0020553 A1 | 1/2007 | Marcello et al. | |
| 2007/0128533 A1 | 6/2007 | Sata et al. | |

(Continued)

FOREIGN PATENT DOCUMENTS

CN 1408079 A 4/2003

(Continued)

OTHER PUBLICATIONS

U.S. Office Action mailed Nov. 21, 2008 in corresponding U.S. Appl. No. 11/652,482.

(Continued)

*Primary Examiner*—Mary Lynn F Theisen
(74) *Attorney, Agent, or Firm*—Nixon & Vanderhye P.C.

(57) ABSTRACT

The aggregated particles are manufactured through a method of manufacturing aggregated particles, which includes an aggregating step, a depressurizing step, and a cooling step. In the aggregating step, a slurry is prepared which contains aggregated particles obtained by flowing an aqueous slurry of resin fine particles having a volume average particle diameter in the range of 0.4 μm to 3 μm through a coiled piping in a heated and pressurized state and thereby aggregating the resin fine particles. In the depressurizing step, the slurry containing the aggregated particles is depressurized, and a particle size control is conducted by disintegrating coarse particles so as to homogenize particle diameters of the aggregated particles. In the cooling step, the slurry containing the aggregated particles of which particle diameters have been homogenized is cooled.

7 Claims, 10 Drawing Sheets

U.S. PATENT DOCUMENTS

| | | |
|---|---|---|
| 2007/0166638 A1 | 7/2007 | Matsumoto et al. |
| 2008/0029924 A1 | 2/2008 | Maezawa et al. |
| 2008/0063970 A1 | 3/2008 | Kikawa et al. |
| 2009/0042119 A1 | 2/2009 | Matsumoto et al. |
| 2010/0021210 A1 | 1/2010 | Maezawa et al. |

FOREIGN PATENT DOCUMENTS

| | | |
|---|---|---|
| CN | 1615175 A | 5/2005 |
| JP | 03-056969 | 3/1991 |
| JP | 04-174861 | 6/1992 |
| JP | 07-075666 | 3/1995 |
| JP | 08-146657 | 6/1996 |
| JP | 09-277348 | 10/1997 |
| JP | 10-186714 | 7/1998 |
| JP | 63-278547 A | 11/1998 |
| JP | 2001-209212 | 8/2001 |
| JP | 2001-324831 | 11/2001 |
| JP | 2002-351140 A | 12/2002 |
| JP | 2003-345063 | 12/2003 |
| JP | 2005-128176 | 5/2005 |
| JP | 2005-165039 | 6/2005 |
| JP | 2006-91882 | 4/2006 |
| JP | 2006-189710 | 7/2006 |
| JP | 2007-34290 A | 2/2007 |
| JP | 2007-108458 | 4/2007 |
| WO | WO 01/84248 A1 | 11/2001 |
| WO | WO03/059497 | 7/2003 |

OTHER PUBLICATIONS

Office Action dated Mar. 9, 2010 mailed in U.S. Appl. No. 12/188,495.

* cited by examiner

US 7,833,446 B2

METHOD OF MANUFACTURING AGGREGATED PARTICLES

CROSS-REFERENCE TO RELATED APPLICATION

This application claims priority to Japanese Patent Application Nos. P2006-210316, which was filed on Aug. 1, 2006 and P2007-200195 which was filed on Jul. 31, 2007, the contents of which are incorporated herein by reference in its entirety.

BACKGROUND OF THE INVENTION

1. Field of the Invention

The present invention relates to a method of manufacturing aggregated particles.

2. Description of the Related Art

In an image forming apparatus according to an electrophotographic process, on an electrostatic latent image formed on a photoreceptor surface, charged toner is fed to develop the electrostatic latent image to form a toner image and the toner image is fixed on a recording medium to form an image. According to the electrophotographic process, when the toner is uniformly transferred on an electrostatic latent image, an image high in the image density and excellent in the image quality can be formed. When the toner is transferred and evenly attached on an electrostatic latent image, it is important that particle diameters of the toner particles are homogeneous to be narrow in particle size distribution width and charging properties are homogeneous. The particle diameter of the toner affects not only on the charging property but also on high definition reproduction of an original image. The toner having an appropriately small particle diameter, that is, toner having a particle diameter in the range of substantially 5 μm to 6 μm is effective in obtaining a high definition copy image. Accordingly, in order to homogenize and reduce the toner particle size, various studies have been conducted.

As a method of manufacturing a diameter-reduced toner, there has bee developed, for instance, a wet process that the toner is manufactured in an organic solvent or a mixed solvent of organic solvent and water. The toner manufactured through the wet process is referred to as a chemical toner. Among the wet processes, an aggregation process has been known as a process of homogenizing toner particle diameters. According to the aggregation process, in aqueous slurry in which for instance fine resin particles, colorant particles and mold releaser particles are dispersed, an aggregating agent such as a divalent or trivalent metal salt is added to aggregate the resin particles, colorant particles and mold releaser particles to produce aggregated particles that are toner. In the aggregation process, a reaction vessel is used. The reaction vessel is a chamber-typed reactor onto whose outer circumference a heat-exchanging jacket is attached and inside of which a stirring blade is provided.

The aggregation process involves the following problems to be solved. The particles such as resin fine particles contained in the aqueous slurry are readily excessively aggregated, which results in formation of aggregated particles unnecessarily large in the particle diameter. Accordingly, as one of the problems, it is difficult to obtain at high accuracy aggregated particles which have desired particle distribution and shapes, and as another problem, it is required that an aggregation reaction be carried out over a long time to control particle diameters of aggregated particles. As still another problem, the colorant particles are irregularly exposed on aggregated particle surface to cause fluctuation in the charging property of individual aggregated particles and toner filming where the mold releaser particles are exposed on the aggregated particle surface and the mold releaser particles are melted and attached on a photoreceptor surface is caused, and thereby image defect is caused.

In view of such problems, a producing process of toner, in which, for instance, resin particles obtained by polymerizing polymerizable monomers in an aqueous medium in the presence of a surfactant having a polymerizing unsaturated group and a colorant are aggregated under heating and the presence of an aggregating agent is proposed (for instance, Japanese Unexamined Patent Publication JP-A 2003-345063). According to JP-A 2003-345063, a surfactant having a polymerizing unsaturated group is a nonionic surfactant having a polymerizing unsaturated group including a vinyl bond. As the aggregating agent, alkali metal salts, alkaline earth metal salts, salts of divalent metals such as manganese and copper and salts of trivalent metals such as iron and aluminum can be used.

The aggregating agent is dissolved in an appropriate solvent and added as a solution to a reaction system described in JP-A 2003-345063. Since when an aggregating agent solution is added, a reaction system of JP-A 2003-345063 is likely to cause the excessive aggregation, it is important to add the solution at a low aggregating agent concentration. For instance, in paragraphs [0132] through [0133] of JP-A 2003-345063, aqueous slurry containing 420.7 g of resin particles, 900 g of ion-exchanged water, 166 g of a colorant dispersion solution, 12.1 g of magnesium chloride hexahydrate and 1000 ml of ion-exchanged water is used. In the aqueous slurry, a concentration of magnesium chloride hexahydrate as an aggregating agent is only substantially 0.48% by weight. At such a low concentration, it takes a long time to aggregate. Furthermore, even when the aggregating agent is set at a low concentration, the excessive aggregation may occur; accordingly, it takes a long time to heat and agitate for temperature-up to an aggregation temperature and aging. Such a producing process is low in the productivity and cannot be carried out in an industrial scale. Furthermore, a problem is not solved that colorant particles are irregularly exposed on aggregated particle surface, resulting in fluctuation of the charging property. Still furthermore, numbers of the resin particles, colorant particles and mold releaser particles in individual aggregated particles are not uniform. Accordingly, a difference in component ratios among individual aggregated particles also results in fluctuation of the charging property.

Furthermore, a producing process of capsulated particles, in which, by use of a batch system, mother particles having a number average particle diameter in the range of 0.1 μm to 100 μm and daughter particles having a number average particle diameter one fifth or less the number average particle diameter of mother particles are processed with a homogenizer at injection pressure of 29.4 MPa (300 kgf/cm$^2$) or more to aggregate daughter particles on a mother particle surface, is disclosed (for instance, JP-B 7-75666). Still furthermore, in a technology of JP-B 7-75666, in order to inhibit the excessive aggregation from occurring to obtain particles homogeneous in the particle diameter, pressure of 54.8 MPa or more is necessary. A homogenizer used in the technology of JP-B 7-75666 is, according to page 3, fifth column and 8 through 18 lines of JP-B 7-75666, a homogenizer in which pressurized dispersion elements are collided with each other (such as a micro-fluidizer) or a homogenizer in which pressurized dispersion elements are collided against an inner wall (such as a Manton Gaulin homogenizer). The homogenizers all do not have a coiled piping such as a homogenizer used in the invention; accordingly, the homogenizers can apply shearing force but cannot sufficiently apply centrifugal force. Furthermore, according to the technology of JP-B 7-75666, an aggregation operation is carried out under such high pressure as 29.4 MPa or more, in some cases, 54.8 MPa or more as described above. Accordingly, when the aggregation operation is carried out in an industrial scale, a pressure-proof apparatus and an escape apparatus are indispensable to necessarily result in a large scale homogenizer. That is, the process is not a practical one. Still furthermore, since only daughter particles having a number volume average particle diameter one fifth or less a volume average particle diameter of the mother particles can be used, usable daughter particles are restricted.

Further, there has been proposed a method of manufacturing a toner, in which method shape control of toner particles are carried out in a toner channel for the purpose of forming toners homogeneous in shape (for instance, Japanese Unexamined Patent Publication JP-A 2006-189710). According to JP-A 2006-189710, an aqueous medium containing resin particles flows through the toner channel under heat after aggregation of the resin particles or after fusion following the aggregation. The heating operation will generate surface tension which acts on the toner to be more spherical, thus forming the toners which are homogeneous in shape. As one example of the toner channel, there is stated a spirally-extending toner channel in JP-A 2006-189710. In the method of manufacturing a toner disclosed in JP-A 2006-189710, the aggregated particles flow through the toner channel after aggregation of the resin particles or after fusion following the aggregation, and it is therefore not possible to adjust the particle size of the aggregated particles although the shape thereof can be homogeneous. It is thus difficult to obtain at high accuracy the toner which exhibits an arrow particle distribution. Further, in the toner disclosed in JP-A 2006-189710, the resin particles are formed by a polymerization process, with the result that content and distribution of toner components such as a colorant in the toner particles are inhomogeneous, which causes the toner to be inhomogeneously charged.

SUMMARY OF THE INVENTION

An object of the invention is to provide a method of manufacturing aggregated particles which are appropriately reduced in diameter with desired particle distribution and shapes and less variation in properties.

The invention provides a method of manufacturing aggregated particles, comprising:

an aggregating step of obtaining an aqueous slurry of aggregated particles by flowing an aqueous slurry of resin fine particles down through a coiled piping under heat and pressure;

a depressurizing step of depressurizing the aqueous slurry of aggregated particles in order to remove bubbles from surfaces of the aggregated particles in the aqueous slurry; and a cooling step of cooling the aqueous slurry of aggregated particles.

According to the invention, in an aggregating step, resin fine particles are made to flow through a coiled piping under heat and pressure, and in a depressurizing step, the aqueous slurry of aggregated particles formed of the resin particles aggregated in the aggregating step is depressurized so as to remove bubbles attached to surfaces of the aggregated particles in the aqueous slurry. The removal of the bubbles attached to the surfaces of the aggregated particles will cause the aggregated particles in the aqueous slurry to be more easily blended into an aqueous solution, thus allowing to more effectively impart external force to the aggregated particles. And in a cooling step, the aqueous slurry of the aggregated particles is cooled which have been depressurized and from which the bubbles have been sufficiently removed in the depressurizing step. Accordingly, at the time of aggregating the resin fine particles to obtain the aggregated particles, the resin fine particles will hardly suffer from the excessive aggregation while particle sizes of the aggregated particles can be readily controlled and the resin fine particles can be aggregated at relatively low pressure, with the result that scale-up to an industrial scale can be preferably applied. Further, shapes of the aggregated particles can be made homogeneous, and a width of particle size distribution can be made narrow, thus resulting in the aggregated particles whose properties are substantially the same and which have very small variation in the properties.

Further, in the invention, it is preferable that a volume average particle diameter of the resin fine particles is in the range of 0.4 µm to 3 µm.

According to the invention, a volume average particle diameter of the resin fine particles is preferably in the range of 0.4 µm to 3 µm. When such resin fine particles are aggregated, preferable properties of the aggregated particles manufactured according to the invention are more remarkably shown. The preferable properties include the homogeneity in the shape, the reduced size in particle diameter and the narrowness in the particle size distribution Further, in the invention, it is preferable that the method comprises, before the aggregating step, a resin fine particle-containing aqueous slurry preparing step of preparing the aqueous slurry of resin fine particles through a high-pressure homogenizer process.

According to the invention, the aqueous slurry of resin fine particles is preferably prepared through a high-pressure homogenizer process in a resin fine particle-containing aqueous slurry preparing step before the aggregating step. Since such the resin fine particles in the aqueous slurry are homogeneous in the shape and narrow in the particle size distribution, the aggregating property is excellent and an aggregating force between the resin fine particles is relatively strong. Accordingly, when the resin fine particles are used, substantially spherical aggregated particles can be readily obtained.

Further, in the invention, it is preferable that the resin fine particle-containing aqueous slurry includes a pulverizing stage of obtaining an aqueous slurry that contains resin fine particles having particle diameters of 3 µm or less, in which stage an aqueous slurry of coarse particles of synthetic resin or synthetic resin containing a colorant and a mold releaser is made to pass through a pressure-proof nozzle under heat and pressure to pulverize the coarse particles.

According to the invention, in a pulverizing stage of the resin fine particle-containing aqueous slurry preparing step, an aqueous slurry of coarse particles of synthetic resin or synthetic resin containing a colorant and a mold releaser is made to pass through a pressure-proof nozzle under heat and pressure to pulverize the coarse particles, thus resulting in an aqueous slurry containing resin fine particles having particle diameters of 3 µm or less. In the pulverizing stage, the coarse particles of synthetic resin is heated so as to be easily pulverized and moreover, the aqueous slurry containing the coarse particles of synthetic resin can pass through a narrow flow path of the pressure-proof nozzle at high speed by applying pressure thereon. Such a rapid passage will enhance shearing force and thus allows the coarse particles of softened synthetic resin to be effectively formed into fine particles. This thus gives advantages in homogenizing shapes of resin fine particles obtained by pulverizing the coarse particles of the synthetic resin, in forming the fine particles and in enhancing the yield.

Further, in the invention, it is preferable that the depressurizing step is carried out by flowing the aqueous slurry of aggregated particles down through a depressurizing nozzle.

According to the invention, when an aqueous slurry of aggregated particles is made to flow through a depressurizing nozzle in the depressurizing step, the aqueous slurry can be depressurized without causing the bubbling due to the bumping. When the bubbling due to the bumping resulting from a decrease in pressure applied to the aqueous slurry of aggregated particles is prevented as described above, the resin fine particles can be prevented from being excessively aggregated at the time of the bumping, with the result that coarse particles will not be generated. Furthermore, even when the coarse particles are present, superfluous resin fine particles can be detached from the coarse particles. Accordingly, there will be obtained the aggregated particles which are appropriately reduced in the particle diameter and narrow in the particle size distribution. More specifically, when pressure of for instance 100 MPa is rapidly lowered to substantially atmospheric pressure, a phenomenon like jet spray is caused accompanying the bumping of the slurry, and air is caught in the aqueous slurry of resin fine particles, thus causing the bubbling. The bubbling accelerates the excessive aggregation of the resin fine particles in the aqueous slurry of resin fine particles. Further, in the case where a dispersion stabilizer is used in the aggregating step, the dispersion stabilizer which should be properly used for dispersing the resin fine particles in the aqueous slurry, may concentrate around bubbles due to affinity thereto, which further accelerates the excessive aggregation of the resin fine particles. When the depressurizing nozzle is used, the pressure can be largely lowered in a short time without causing the phenomenon as described above.

Further, in the invention, it is preferable that the coiled piping is wound 1 to 200 times and a coil radius is in the range of 25 mm to 200 mm.

According to the invention, a coiled piping used in the aggregating step is preferably wound 1 to 200 times with a coil radius in the range of 25 mm to 200 mm. When such a coiled piping is used, the excessive aggregation of the resin fine particles and the generation of coarse particles resulting therefrom can be assuredly inhibited from occurring in the aggregating step, and the particle size of aggregated particles can be readily controlled, with the result that such the coiled piping can be advantageously used for industrial scale-up.

Further, in the invention, it is preferable that the aggregating step is carried out under heat at a temperature in a range from a glass transition temperature to a softening temperature of the resin fine particles and under pressure in a range of 5 MPa to 100 MPa.

According to the invention, when the aggregating step is carried out under heat at a temperature in the range of a glass transition temperature of resin fine particles to a softening temperature thereof and under pressure in the range of 5 MPa to 100 MPa, it is possible to obtain the aggregated particles in a short time at high yield without the excessive aggregation of the resin fine particles. Furthermore, since the aggregation can be assuredly caused even under relatively low pressure in the range of substantially 5 MPa to 10 MPa, the invention is industrially advantageous and applicable for industrial scale-up in comparison with an existing homogenizer process where the pressurization of at least substantially 30 MPa is required. When the temperature and pressure are appropriately controlled in the ranges stated above, the controllability on the diameter of the aggregated particles can be further enhanced.

BRIEF DESCRIPTION OF THE DRAWINGS

Other and further objects, features, and advantages of the invention will be more explicit from the following detailed description taken with reference to the drawings wherein.

DETAILED DESCRIPTION

Figure 1:
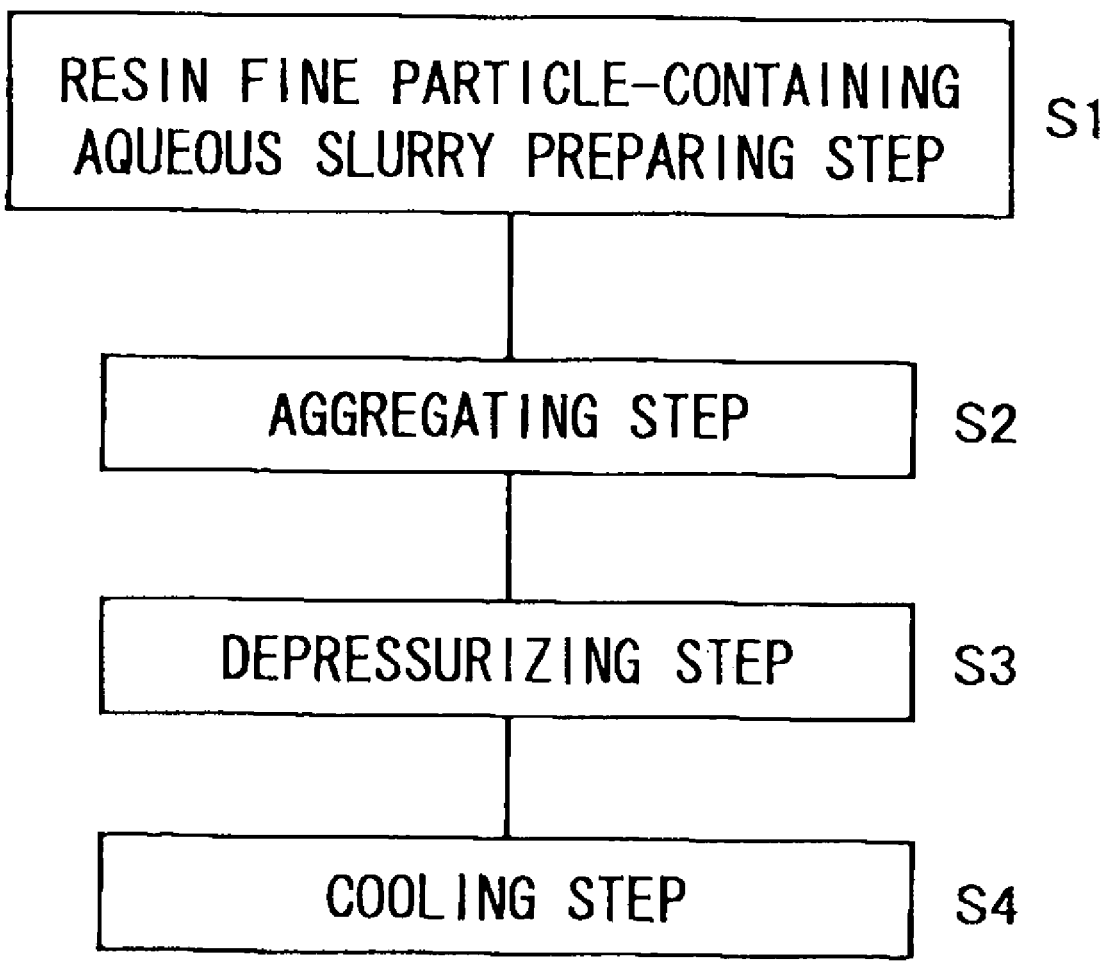
FIG. 1 is a flowchart showing a method of manufacturing resin fine particles according to one embodiment of the invention.

Now referring to the drawings, preferred embodiments of the invention are described below.

[Method of manufacturing aggregated particles] FIG. 1 is a flowchart showing a method of manufacturing resin fine particles according to one embodiment of the invention. The method of manufacturing the aggregated particles according to the present embodiment includes a resin fine particle-containing aqueous slurry preparing step S1, an aggregating step S2, a depressurizing step S3, and a cooling step S4.

[Resin Fine Particle-Containing Aqueous Slurry Preparing Step S1]

In the resin fine particle-containing aqueous slurry preparing step S1, an aqueous slurry of resin fine particles is prepared. The aqueous slurry of resin fine particles is obtained by dispersing resin fine particles into a liquid such as water.

Figure 2:
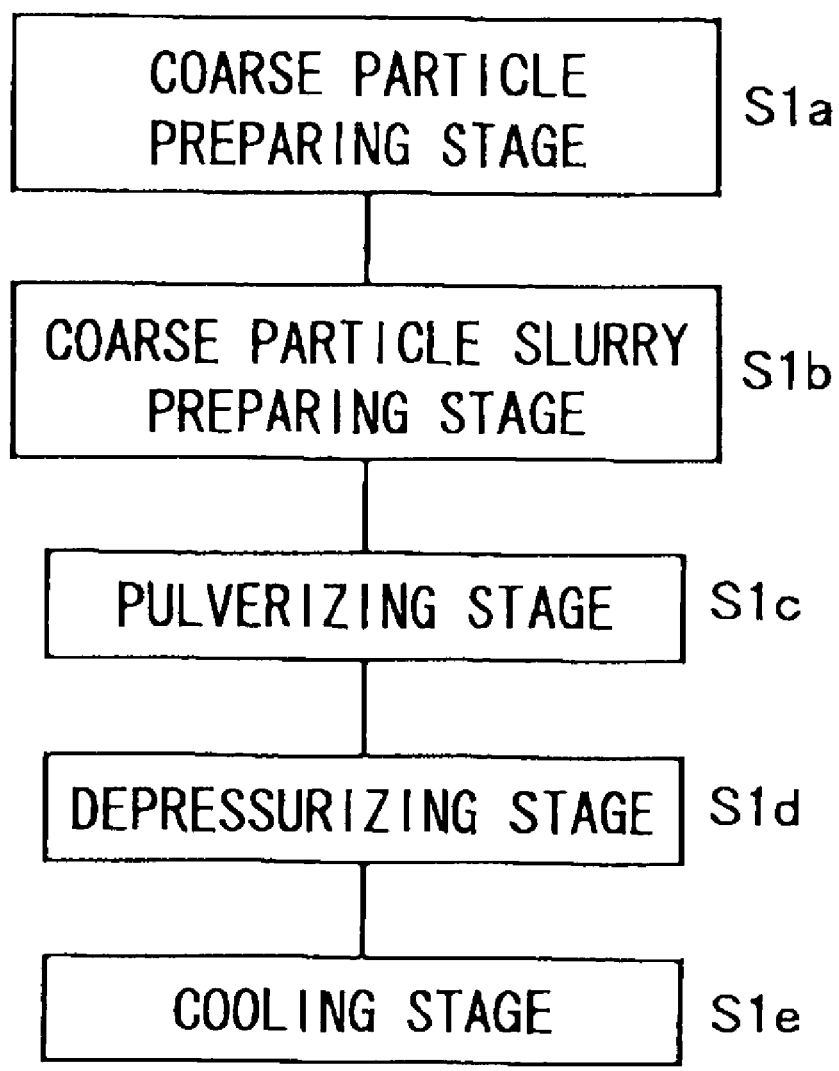
FIG. 2 is a flowchart showing a resin fine particle-containing aqueous slurry preparing step.

FIG. 2 is a flowchart showing a resin fine particle-containing aqueous slurry preparing step. The resin fine particle-containing aqueous slurry preparing step S1 includes a coarse particle preparing stage S1a, a coarse particle slurry preparing stage S1b, a pulverizing stage S1c, a depressurizing stage S1d, and a cooling stage S1e.

The resin fine particles can be produced by means of a known granulation method of synthetic resin, and preferable are resin fine particles produced by means of a high-pressure homogenizer process. That is to say, it is preferred that the aqueous slurry of resin fine particles be manufactured through a high-pressure homogenizer process. In the invention, "the high-pressure homogenizer process" is a process in which synthetic resin is granulated by use of a high-pressure homogenizer and the high-pressure homogenizer is an apparatus that pulverizes particles under pressure.

As the high-pressure homogenizer, commercially available ones and ones described in patent literatures are known. As the commercially available ones of the high-pressure homogenizers, for instance, chamber type high-pressure homogenizers such as Microfluidizer (trade name, produced by Microfluidics Corp.), Nanomizer (trade name, produced by Nanomizer Inc.) and Ultimizer (trade name, produced by Sugino Machine); High-pressure homogenizer (trade name, produced by Rannie Inc.); High-pressure homogenizer (trade name, produced by Sanmaru Machinery Co., Ltd.); and High-pressure homogenizer (trade name, produced by Izumi Food Machinery Co., Ltd.) can be cited. As the high-pressure homogenizers described in patent literatures, one described in WO 03/059497 can be cited. Among these, the high-pressure homogenizer described in WO 03/059497 is preferred. The aqueous slurry of resin fine particles is prepared by use of a high-pressure homogenizer 1 for pulverization use shown in FIG. 3.

Figure 3:
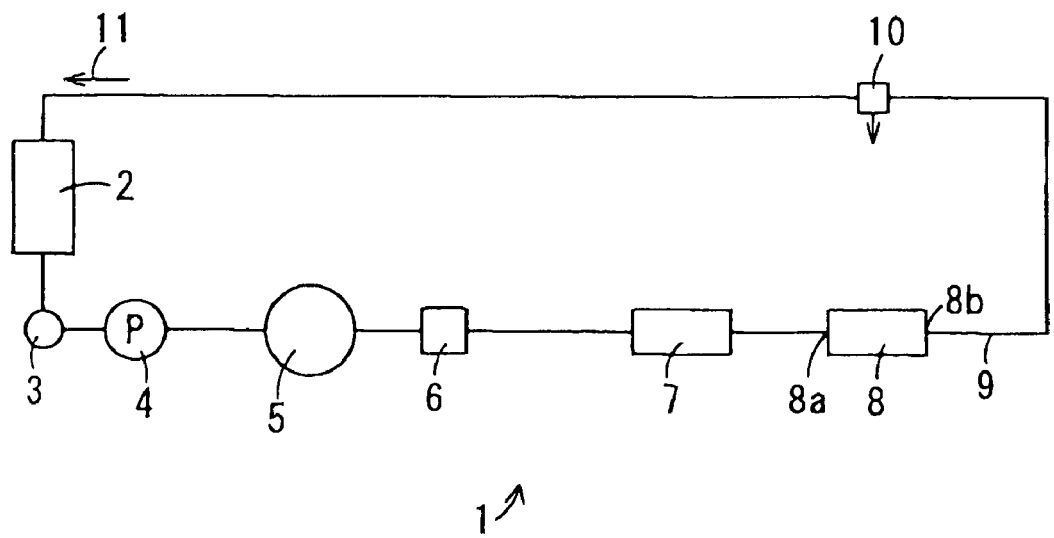
FIG. 3 is a system diagram schematically showing a configuration of a high-pressure homogenizer for pulverization use.

FIG. 3 is a system diagram schematically showing a configuration of the high-pressure homogenizer 1 for pulverization use. The high-pressure homogenizer 1 for pulverization use includes a tank 2, a transfer pump 3, a pressure unit 4, a heater 5, a pulverizing nozzle 6, a depressurizing module 7, a cooler 8, a piping 9 and an outlet port 10. In the high-pressure homogenizer 1 for pulverization use, the tank 2, the transfer pump 3, the pressure unit 4, the heater 5, the pulverizing nozzle 6, the depressurizing module 7 and the cooler 8 are connected in this order via the piping 9. In a system connected via the piping 9, the aqueous slurry of resin fine particles cooled by the cooler 8 may be taken outside of the system from the outlet port 10 or may be returned once more to the tank 2 to repeat circulation in an arrow mark direction 11. A stage until the coarse particle slurry stored in the tank 2 has passed through the pulverizing nozzle 6 is called the pulverizing stage S1c. A stage until the coarse particle slurry has passed through the depressurizing module 7 is called the depressurizing stage S1d. And a stage until the coarse particle slurry has passed through the cooler 8 is called the cooling stage S1e.

The tank 2 is a vessel-like member having an internal space and reserves coarse particle slurry obtained in the coarse particle slurry preparing stage S1b. The transfer pump 3 transfers the coarse particle slurry reserved in the tank 2 to the pressure unit 4. The pressure unit 4 pressurizes the coarse particle slurry supplied from the transfer pump 3 to supply to the heater 5. In the pressure unit 4, for instance, a plunger pump that includes a plunger and a pump that is suction/discharge driven by means of the plunger can be used.

Figure 6:
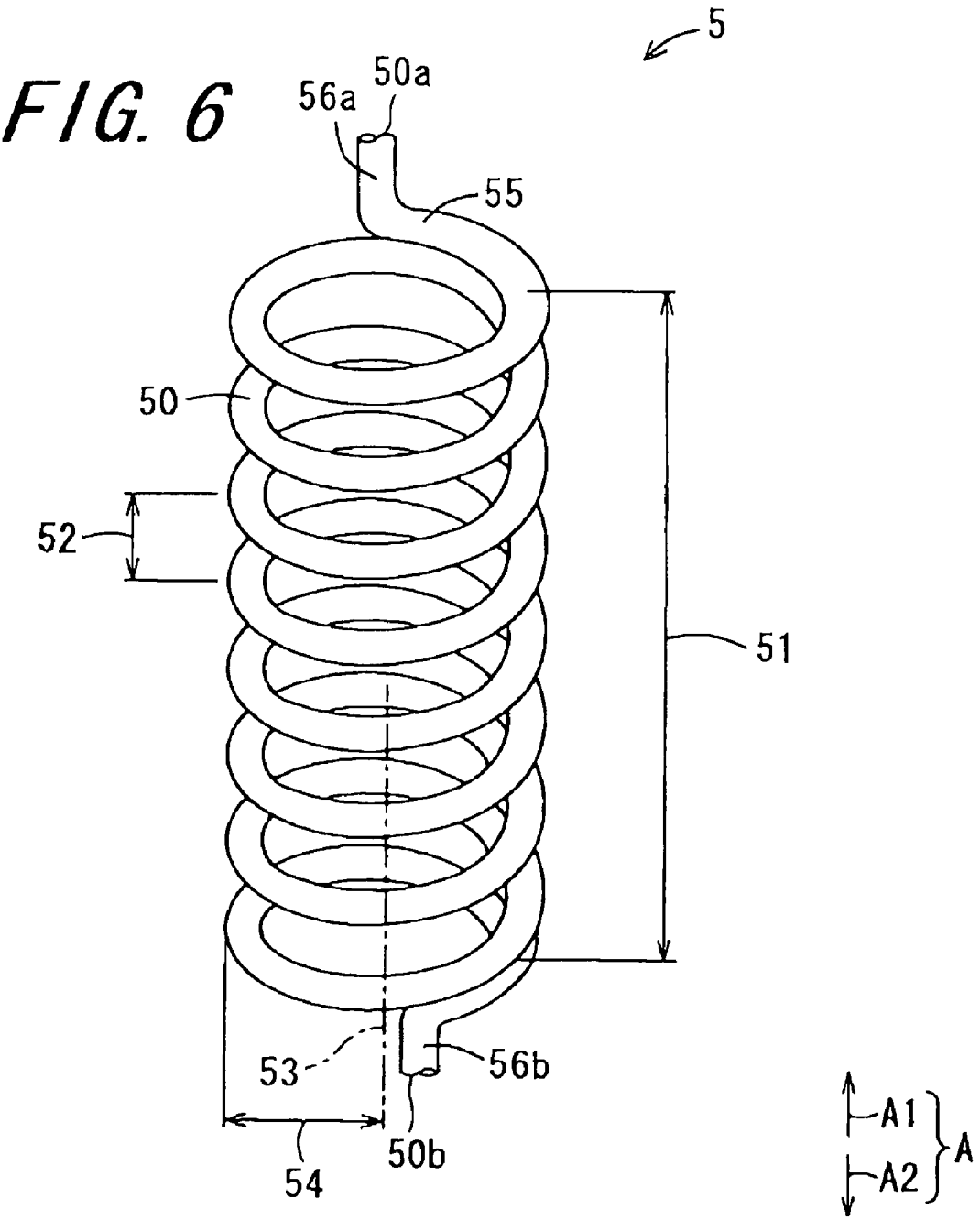
FIG. 6 is a perspective view showing a configuration of a heater.

FIG. 6 is a perspective view showing a configuration of the heater 5. The heater 5 heats coarse particle slurry supplied from the pressure unit 4 and in a pressurized state. As the heater 5, a heater can be used that includes a coiled (which may also be referred to as "spiral" hereinafter) piping 50 and a heater portion (not shown). In the embodiment, the coiled piping 50 has a cylindrical shape and is composed of one pipe-like member wound in a single-layered coil form. To be more specific, the coiled piping 50 includes a wound portion 55 composed of the pipe-like member wound in a circumferential direction, and two connection portions 56a and 56b which extend from the wound portion 55 respectively in axial directions A1 and A2. In the two connection portions 56a and 56b, an inlet 50a is formed in a flow path of the first connection portion 56a extending in the axial direction A1 while an outlet 50b is formed in a flow path of the second connection portion 56b extending in the axial direction A2. The inlet 50a and the outlet 50b in the flow path of the coiled piping 50 are both coupled to the piping 9. A size of the coiled piping 50 in the axial direction A is referred to as "a free height 51". A size of a half of an outside diameter of the coiled piping 50 is referred to as "a coil radius (which may be hereinafter referred to also as a coil curvature radius) 54". And a distance that the pipe-like member proceeds for one winding, that is, a space between two adjacent parts of the pipe-like member is referred to as "a coil pitch 52". The heater portion is disposed a long an external surface of the coiled piping and includes a piping through which a heating medium such as steam can flow and a heating medium supply portion that supplies the heating medium to the piping. The heating medium supply portion is for instance a boiler.

Figure 7A:
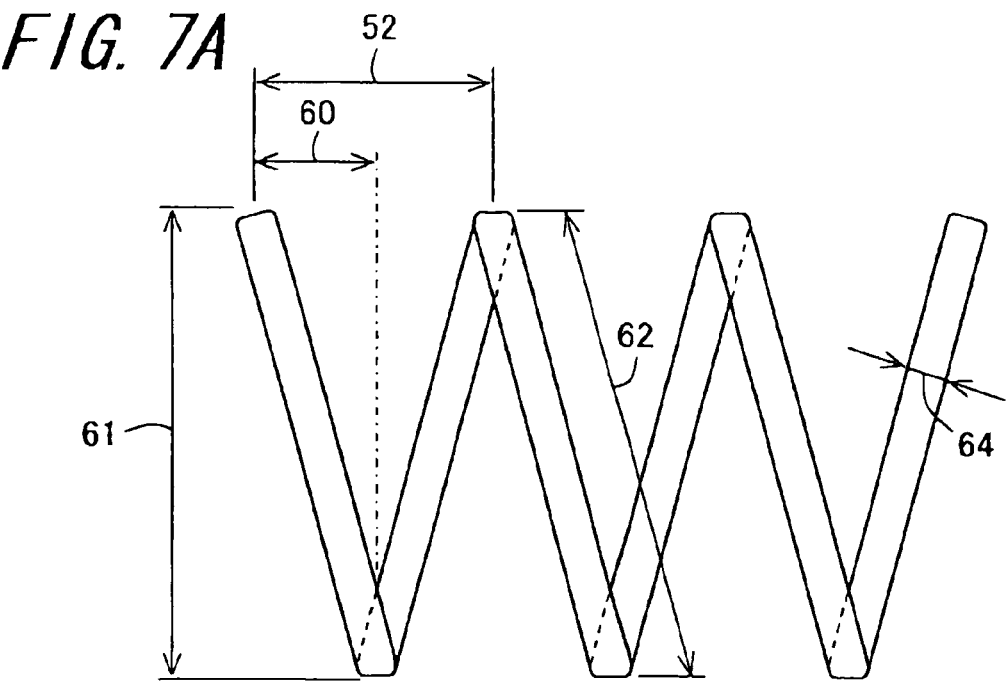
FIG. 7A is a plane projection view showing a coiled piping of the heater in FIG. 6, projected on a virtual plane parallel to an axis of the heater.
Figure 7B:
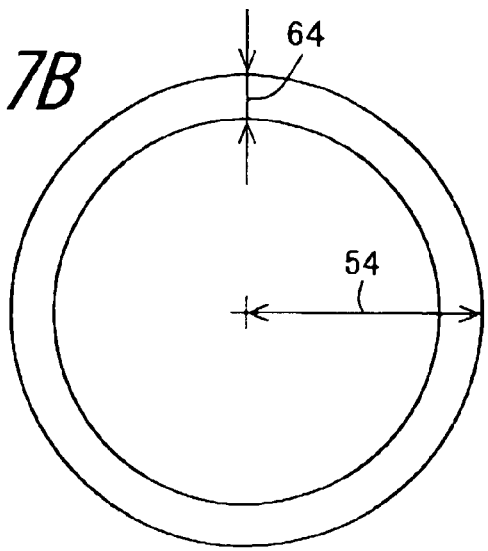
FIG. 7B is a plane projection view showing the coiled piping of the heater in FIG. 6, projected on a virtual plane perpendicular to the axis of the heater.

FIG. 7A is a plane projection view showing the coiled piping 50 of the heater 5 in FIG. 6, projected on a virtual plane parallel to an axis 53 of the heater. FIG. 7B is a plane projection view showing the coiled piping 50 of the heater 5 in FIG. 6, projected on a virtual plane perpendicular to the axis 53 of the heater. In FIG. 7A, a length of a half of a coil pitch is referred to as a ½ coil pitch. A length of an outside diameter of the coiled piping is referred to as a perpendicular oriented height 61. A length of the pipe-like member required for a half-turn is referred to as an actual coil height 62. In FIG. 7B, an inner diameter of the pipe-like member is referred to as a coil inner diameter 64.

When aqueous slurry containing particles is made to flow through the coiled piping in the heater 5, in a heated and pressurized state, a centrifugal force and a shearing force are given. When the centrifugal force and shearing force are simultaneously applied, a turbulent flow is generated in the flow path. When the particles are particles sufficiently small such as resin fine particles having a volume average particle diameter in the range of 0.4 μm to 3 μm, the particles are affected by the turbulent flow to flow irregularly and thereby the number of mutual collisions of the particles becomes remarkably larger than that of coarse particles having a volume average particle diameter of substantially 100 μm, thus causing aggregation. On the other hand, when the particles are coarse particles having a volume average particle diameter of substantially 100 μm, since the particles are sufficiently large, the particles stably flow in the neighborhood of a wall surface in a flow path owing to the centrifugal force to be hardly affected by the turbulent flow. Accordingly, the aggregation is hard to occur.

The pulverizing nozzle 6 allows the coarse particle slurry supplied from the heater 5 in a heated and pressurized state flowing down through the flow path formed inside thereof to pulverize the coarse particles contained in the coarse particle slurry so as to be formed into diameter-reduced resin fine particles. As the pulverizing nozzle 6, it is possible to use a general pressure-proof nozzle through which liquid can flow. However, for instance a multiple nozzle having a plurality of flow paths can be preferably used. Flow paths of the multiple nozzle may be formed in a concentric fashion with an axis center as a center or a plurality of flow paths may be formed substantially in parallel with a longer direction of the multiple nozzle. As a specific example of the multiple nozzle, it is possible to use a nozzle having one or a plurality, preferably substantially 1 to 2, of flow paths of which inlet and outlet diameters are in the range of substantially 0.05 mm to 0.35 mm and each of which length is in a range of 0.5 cm to 5 cm. Furthermore, a pressure-proof nozzle in which a flow path is not formed straight inside thereof can be used as well. As such a pressure-proof nozzle, one shown in for instance FIG. 4 can be cited.

Figure 4:
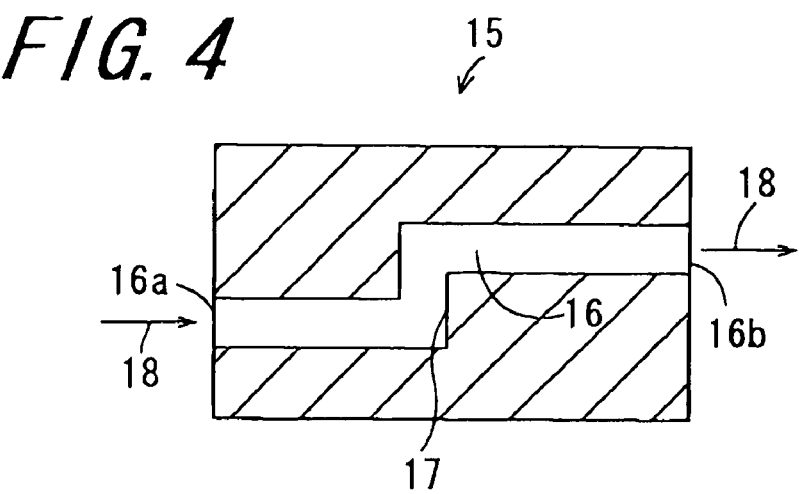
FIG. 4 is a sectional view schematically showing a configuration of a pressure-proof nozzle.

FIG. 4 is a sectional view schematically showing a configuration of a pressure-proof nozzle 15. The pressure-proof nozzle 15 has a flow path 16 inside thereof. The flow path 16 has an inlet 16a and an outlet 16b, both of which are coupled to a piping 9. The flow path 16 bends in hook and has at least one collision wall 17 to which coarse particle slurry entering from a direction of an arrow mark 18 into the flow path 16 collides. The coarse particle slurry collides against the collision wall 17 at substantially right angle to pulverize the coarse particles in the coarse particle slurry to form further diameter-reduced resin fine particles, followed by exhausting from the outlet of the pressure-proof nozzle 15. In the pressure-proof nozzle 15, the inlet and the outlet have the same diameter. However, without restricting thereto, the outlet diameter may be formed smaller than the inlet diameter. The inlet 16a and outlet 16b each are usually formed into a perfect circle. However, without restricting thereto, the inlet and outlet may be formed in a regular polygon The pressure-proof nozzle may be disposed singularly or in plural In the case of disposing a plurality of the pressure-proof nozzles, they may be arranged in series or parallel with the piping 9.

As the depressurizing module 7, a multistage depressurizing apparatus described in WO 03/059497 can be preferably used. The multi-stage depressurizing apparatus includes an inlet path, an outlet path and a multi-stage depressurizing path. The inlet path is connected at one end to the piping 9 and at the other end to the multi-stage depressurizing path and introduces the slurry containing resin fine particles in a heated and pressurized state in the multi-stage depressurizing path. The multi-stage depressurizing path is connected at one end to the inlet path and at the other end to the outlet path. The aqueous slurry of resin fine particles introduced into the multi-stage depressurizing path through the inlet path in a heated and pressurized state is depressurized so as to remove bubbles from surfaces of the aggregated particles in the aqueous slurry and thereby prevent bubbles (bubbling) due to the bumping.

The multi-stage depressurizing path includes for instance a plurality of depressurizing members and a plurality of connecting members. As the depressurizing member, for instance, a pipe-like member is used. As the connecting member, for instance a ring-like seal member is used. When a plurality of pipe-like members different in inner diameter is connected via a ring-like seal member, a multistage depressurizing path can be constituted. For instance, a multi-stage depressurizing path in which 2 through 4 pipe-like members A having a same inner diameter are connected from the inlet flow path to the outlet flow path through a ring-like seal member, a subsequent pipe-like member B of which an inner diameter is such large as substantially two times that of the pipe-like member A is connected through one ring-like seal member and furthermore substantially 1 through 3 pipe-like members C of which inner diameter is smaller by substantially 5% to 20% than that of the pipe-like member B are connected through a ring-like seal member can be cited. When the heated and pressurized slurry flows through the inside of such the multi-stage depressurizing path, the bubbles can be removed from the surfaces of the aggregated particles in the aqueous slurry of resin fine particles, with the result that the aggregated particles in the aqueous slurry can be more easily blended into an aqueous solution, thus allowing to more effectively impart external force to the aggregated particles. Further, the slurry can be depressurized to atmospheric pressure or a pressurized state close thereto without causing the bubbling. In the surrounding of the multi-stage depressurizing path, a heat exchange portion that uses a cooling medium or a heating medium is disposed and, corresponding to a pressure value applied to the aqueous slurry of resin fine particles, simultaneously with the depressurization, cooling or heating may be applied. The outlet path is connected to the multi-stage depressurizing path at one end and to the piping 9 at the other end and supplies the slurry depressurized by the multi-stage depressurizing path to the piping 9. In the multi-stage depressurizing apparatus, an inlet diameter and an outlet diameter may be formed so as to be same or the outlet diameter may be formed so as to be larger than the inlet diameter.

Figure 5:
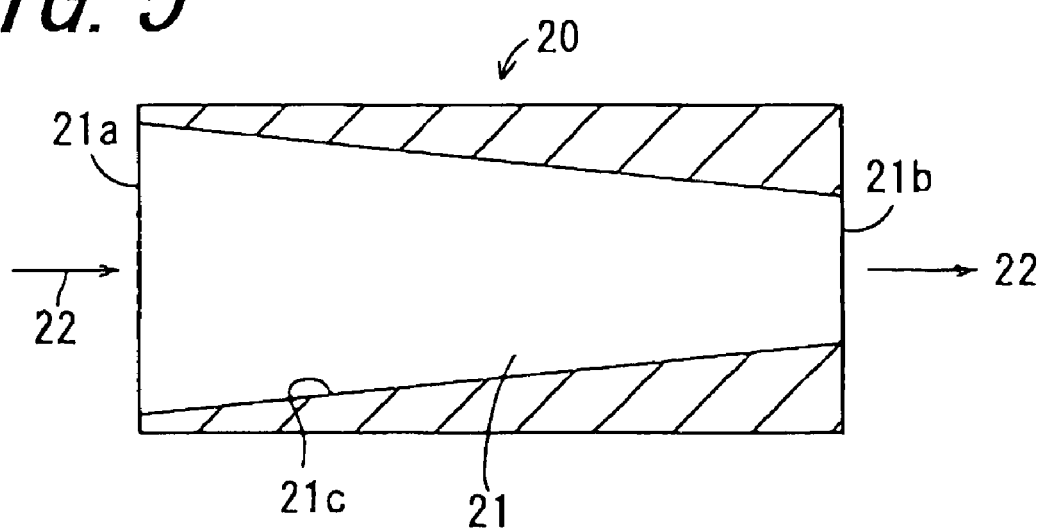
FIG. 5 is a longitudinal sectional view schematically showing a configuration of a depressurizing nozzle.

In the present embodiment, as the depressurizing module 7, without restricting to the multi-stage depressurizing apparatus having a configuration such as mentioned above, for instance, a depressurizing nozzle as well can be used. FIG. 5 is a longitudinal sectional view schematically showing a configuration of a depressurizing nozzle 20. In the depressurizing nozzle 20, a flowpath 21 that penetrates through the inside thereof in a longer direction is formed. An inlet 21a and an outlet 21b of the flow path 21, respectively, are connected to the piping 9. The flow path 21 is formed so that an inlet diameter may be larger than an outlet diameter. Furthermore, in the embodiment, in the flow path 21, a section in a direction vertical to a direction of an arrow mark 22 that is a flowing direction of the slurry is formed so as to become smaller gradually as approaching from the inlet 21a to the outlet 21b and a center (axis line) of the section is formed so as to exist on the same axis line (axis line of the depressurizing nozzle 20) in parallel with a direction of an arrow mark 22. According to the depressurizing nozzle 20, the heated and pressurized aqueous slurry of resin fine particles is introduced from the inlet 21a into the flow path 21 and flows through the flow path 21 while depressurized. The depressurized aqueous slurry of resin fine particles is exhausted from the outlet 21b to the piping 9. An aggregate of coarse particles of synthetic resin aggregated in the heater 5 comes into contact with an inner wall surface 21c of the flow path 21 so that the superfluous coarse particles of synthetic resin are detached from the aggregate, resulting in appropriately-sized resin fine particles which are then discharged from the outlet 21b. Since the inlet diameter is larger than the outlet diameter in the flow path 21 of the depressurizing nozzle 20, applied shearing force is larger than that in the case where the inlet diameter is smaller than the outlet diameter. It is therefore possible to detach the superfluous coarse particles from the aggregate more reliably than the case of the later-described depressurizing nozzle 25 in the depressurizing step S3. There can be disposed one or a plurality of the multi-stage depressurizing apparatus or the depressurizing nozzle as mentioned above. When these are disposed in plural, these may be disposed sequentially or in parallel.

As the cooler 8, a general liquid cooler having a pressure-proof structure can be used. For instance, it is possible to use a cooler that has a piping where cooling water is circulated is disposed in the surroundings of the piping through which the aqueous slurry of resin fine particles flows and that cools the aqueous slurry of resin fine particles by circulating cooling water in the piping. Among these, a cooler large in a cooling area such as a corrugated cooler is preferred. Furthermore, the cooler is preferably constituted so that a cooling gradient may be smaller (or the cooling capacity may be gradually lowered)

from a cooler inlet to a cooler outlet. When the resin fine particles are drastically cooled, the resin fine particles may be locally aggregated, which may cause the excessive aggregation of the resin fine particles. When the resin fine particles are excessively aggregated, the excessively-aggregated resin fine particles may be stuck in the depressurizing module. Accordingly, the cooling gradient needs to be smaller from the inlet to the outlet in order to cool the aqueous slurry of resin fine particles slowly and homogeneously without causing the excessive aggregation of the aggregated particles aggregated in the aggregating step. When the cooler is configured so that the cooling gradient is smaller from the inlet to the outlet, the pulverized resin fine particles can be further inhibited from re-aggregating, compared to the cooler with the cooling gradient unchanged from the cooler inlet to the cooler outlet. Accordingly, the coarse particles are further efficiently granulated into fine particles, and the yield of the resin fine particles is also enhanced. Only one cooler 8 may be disposed or a plurality of the coolers 8 may be disposed. When a plurality of coolers is disposed, the coolers may be disposed in series or in parallel. When the coolers are disposed in series, in a flow direction of the slurry, the coolers are preferably disposed so that the cooling capacity may be gradually smaller. The aqueous slurry of resin fine particles that is exhausted from the depressurizing module 7, contains resin fine particles and is in heated state is introduced for instance in the cooler 8 from an inlet 8a connected to a piping 9 of the cooler 8, cooled inside of the cooler 8 having the cooling gradient and exhausted from the outlet 8b of the cooler 8 to the piping 9.

The high-pressure homogenizer 1 for pulverization use is commercially available. As a specific example thereof, NANO 3000 (trade name, produced by Beryu Co. Ltd.) can be cited. According to the high-pressure homogenizer 1 for pulverization use, coarse particle slurry reserved in a tank 2 is introduced in a heated and pressurized state in a pulverizing nozzle 6 to pulverize the coarse particles to resin fine particles, the slurry of the resin fine particles that are exhausted from the pulverizing nozzle 6 and in a heated and pressurized state is introduced in the depressurizing module 7 to depressurize so as not to cause the bubbling, the slurry of the resin fine particles that are exhausted from the depressurizing module 7 and in a heated state is introduced in the cooler 8 to cool, and thereby slurry of the resin fine particles is obtained. The slurry of the resin fine particles is exhausted from the outlet port 10 or returned again to the inside of the tank 2, followed by similarly pulverizing.

[Coarse Particle Preparing Stage S1a]

In the stage, coarse particles of synthetic resin are prepared. At this time, the synthetic resin may contain at least one kind of additives for synthetic resin. The coarse particles of the synthetic resin can be prepared for instance when a solidified material of a kneaded material containing synthetic resin and as necessary at least one kind of additive for synthetic resin is pulverized. The kneaded material can be prepared for instance when synthetic resin and as necessary at least one kind of additive for synthetic resin are dry mixed by use of a mixer and an obtained powder mixture is kneaded by use of a kneader. The kneading temperature is a temperature equal to or more than a softening temperature of synthetic resin (usually in the range of substantially 80° C. to 200° C. and preferably in the range of substantially 100° C. to 150° C.). Here, as the mixer, known ones can be used. For instance, Henshel type mixers such as Henschel Mixer (trade name, produced by Mitsui Mining Co., Ltd.), Super Mixer (trade name, produced by Kawata Co., Ltd.) and Mechanomill (trade name, produced by Okada Seiko Co., Ltd.), Angmill (trade name, produced by Hosokawa Micron Corporation), Hybridization System (trade name, produced by Nara Machinery Co., Ltd.) and Cosmo System (trade name, produced by Kawasaki Heavy Industry Ltd.) can be cited. As the kneader, known ones can be used. For instance, general kneaders such as a biaxial extruder, a three roller and a Laboplast Mill can be used. More specifically, uni-orbi-axial extruders such as TEM-100B (trade name, produced by Toshiba Machinery Co., Ltd.) and PCM-65/87 (trade name, produced by Ikegai Ltd.) and open roll types such as Kneadics (trade name, produced by Mitsui Mining Co., Ltd. ) can be cited. Among these, an open roll type is preferred. In order to uniformly disperse the additive for synthetic resin such as a colorant in a kneaded material, a master batch may be formed and used. Furthermore, at least two kinds of the additives for synthetic resin may be formed into composite particles to use. The composite particles can be prepared for instance when an appropriate amount of water or lower alcohol is added to at least two kinds of additives for synthetic resin, followed by granulating by use of a general granulator such as a high-speed mill, further followed by drying. The master batch and composite particles are mixed with a powder mixture at the dry mixing.

A solidified material can be obtained when the kneaded material is cooled. When the solidified material is pulverized, a powder crusher such as a cutter mill, feather mill or jet mill is used. Thereby, coarse particles of the synthetic resin can be obtained. Particle diameters of the coarse particles are, though not particularly restricted, preferably in a range of 450 μm to 1000 μm, and more preferably 500 μm to 800 μm The synthetic resin, as far as it can be granulated in a molten state, is not particularly restricted. For instance, polyvinyl chloride, polyvinyl acetate, polyethylene, polypropylene, polyester, polyamide, a styrene polymer, (meth)acrylic resin, polyvinyl butyral, silicone resin, polyurethane, epoxy resin, phenol resin, xylene resin, rosin-modified resin, terpene resin, aliphatic hydrocarbon resin, alicyclic hydrocarbon resin and aromatic petroleum resin can be cited. The (meth)acrylic resin includes homopolymers of (meth)acrylic monomers and copolymers each composed of a (meth)acrylic monomer and a monomer copolymerizable therewith.

The synthetic resins can be used singularly or in a combination of at least two kinds thereof. Among these, polyester, styrene polymer, (meth)acrylic resin, polyurethane and epoxy resin with which particles high in the surface smoothness can be readily obtained by means of wet granulation in an aqueous system are preferred.

As the polyester, known ones can be used. For instance, a polycondensate of a polybasic acid and a polyhydric alcohol can be cited. As the polybasic acid, ones known as monomers for polyester can be used and examples thereof include aromatic carboxylic acids such as terephthalic acid, isophthalic acid, phthalic anhydride, trimelitic anhydride, pyromelitic acid and naphthalene dicarboxylic acid; aliphatic carboxylic acids such as maleic anhydride, fumaric acid, succinic acid, alkenyl succinic anhydride and adipic acid; and a methylesterized substance of these polybasic acids. The polybasic acids can be used singularly or in a combination of at least two kinds thereof. As the polyhydric alcohol as well, ones known as monomers for polyester can be used and examples thereof include: aliphatic polyhydric alcohols such as ethylene glycol, propylene glycol, butanediol, hexanediol, neopentyl glycol and glycerin; alicyclic polyhydric alcohols such as cyclohexanediol, cyclohexanedimethanol and water-added bisphenol A; and aromatic diols such as an ethylene oxide adduct of bisphenol A and propylene oxide adduct of bisphenol A. The polyhydric alcohols can be used singularly or in a combination of at least two kinds thereof.

A polycondensation reaction of a polybasic acid and a polyhydric alcohol can be carried out according to a standard process. For instance, in the presence or absence of an organic solvent and in the presence of a polycondensation catalyst, a polybasic acid and a polyhydric alcohol are brought into contact to conduct the polycondensation reaction and the reaction is terminated when the acid value and softening temperature of generated polyester reach predetermined values. Polyester can be thus obtained. When the polybasic acid is partially replaced by a methyl esterified compound of the polybasic acid, a demethanolation polycondensation reaction is caused. In the polycondensation reaction, when a blending ratio of the polybasic acid and polyhydric alcohol and a reaction rate are appropriately varied, for instance, a carboxyl group content at a terminal of polyester can be controlled and thereby the characteristics of obtained polyester can be controlled. Furthermore, when trimelitic anhydride is used as the polybasic acid, a carboxyl group can be readily introduced in a main chain of the polyester and thereby modified polyester can be obtained. When a hydrophilic group such as a carboxyl group or a sulfonic acid group is bonded to a main chain and/or a side chain of polyester, it is possible to obtain self-dispersable polyester which are dispersible in water.

The styrene base polymers include homopolymers of styrene base monomers and copolymers each composed of a styrene base monomer and a monomer copolymerizable with the styrene base monomer. As the styrene base monomers, for instance, styrene, o-methylstyrene, ethylstyrene, p-methoxystyrene, p-phenylstyrene, 2,4-dimethylstyrene, p-n-octylstyrene, p-n-decylstyrene and p-n-dodecylstyrene can be cited. As the monomers copolymerizable with the styrene base monomer, for instance, (meth)acrylic acid esters such as methyl (meth)acrylate, ethyl(meth)acrylate, propyl(meth)acrylate, butyl(meth)acrylate, isobutyl(meth)acrylate, n-octyl(meth)acrylate, dodecyl(meth)acrylate, 2-ethylhexyl (meth)acrylate, stearyl(meth)acrylate, phenyl(meth)acrylate and dimethylaminoethyl(meth)acrylate; (meth)acrylic monomers such as acrylonitrile, methacrylamide, glycidyl methacrylate, N-methylolacrylamide, N-methylolmethacrylamide and 2-hydroxyethyl acrylate; vinyl ethers such as vinyl methyl ether, vinyl ethyl ether and vinyl isobutyl ether; vinyl ketones such as vinyl methyl ketone, vinyl hexyl ketone and methyl isopropenyl ketone; and N-vinyl compounds such as N-vinyl pyrrolidone, N-vinyl carbazole and N-vinyl indole can be cited. The styrene base monomers and monomers copolymerizable with the styrene base monomers, respectively, can be used singularly or in a combination of at least two kinds thereof. The (meth)acrylic acid includes acrylic acid and methacrylic acid.

The (meth)acrylic resins include homopolymers of (meth)acrylic acid esters and copolymers each composed of (meth)acrylic acid esters and monomers copolymerizable with the (meth)acrylic acid esters. As the (meth)acrylic acid esters, ones same as that mentioned above can be used. As the monomers copolymerizable with the (meth)acrylic acid esters, (meth)acrylic monomers, vinyl ethers, vinyl ketones and N-vinyl compounds can be cited. As these, ones same as that mentioned above can be used. As the (meth)acrylic resins, acrylic resins containing an acidic group as well can be used. The acrylic resins containing an acidic group can be produced when, for instance, at polymerizing an acrylic resin monomer or an acrylic resin monomer and a vinyl monomer, an acrylic resin monomer containing an acidic group or a hydrophilic group and/or a vinyl monomer having an acidic group or a hydrophilic group are used together. As the acrylic resin monomers, known ones can be used and examples thereof include acrylic acid that may have a substituent, methacrylic acid that may have a substituent, acrylic acid ester that may have a substituent and methacrylic acid ester that may have a substitutent. The acrylic resin monomers can be used singularly or in a combination of at least two kinds thereof. As the vinyl monomers, known ones can be used and examples thereof include styrene, α-methylstyrene, vinyl bromide, vinyl chloride, vinyl acetate, acrylonitrile and methacrylonitrile. The vinyl monomers can be used singularly or in a combination of at least two kinds thereof. A styrenic polymer and (meth)acrylic resin are polymerized with a general radical polymerization initiator by use of a solution polymerization process, a suspension polymerization process or an emulsion polymerization process.

Polyurethane is not particularly restricted, and for instance, polyurethane containing an acidic group or a basic group can be preferably used. The polyurethane containing an acidic group or a basic group can be produced according to a known process. For instance, diol containing an acidic group or a basic group, polyol and polyisocyanate may well be addition polymerized. As the diol containing an acidic group or a basic group, for instance, dimethylolpropionic acid and N-methyldiethanolamine can be cited As the polyol, for instance, polyether polyol such as polyethylene glycol, polyester polyol, acryl polyol and polybutadiene polyol can be cited. As the polyisocyanate, for instance, tolylene diisocyanate, hexamethylene diisocyanate and isophorone diisocyanate can be cited. The respective components can be used singularly or in a combination of at least two kinds thereof.

The epoxy resin is not particularly restricted, and epoxy resin containing an acidic group or a basic group can be preferably used. The epoxy resin containing an acidic group and a basic group can be produced by adding or addition polymerizing for instance polyvalent carboxylic acid such as adipic acid and trimelitic anhydride or amine such as dibutylamine or ethylenediamine to epoxy resin that serves as a base.

In the invention, as the synthetic resin, a self-dispersible resin may be used. The self-dispersible resin is a resin that has a hydrophilic group in a molecule and the dispersibility to liquid such as water. Examples of the hydrophilic groups include —$COO^-$ group, —$SO_3^-$ group, —CO group, —OH group, —$OSO_3^-$ group, —$PO_3H_2$ group, —$PO_4^-$ group and salts thereof. Among these, anionic hydrophilic group such as —$COO^-$ group and —$SO_3^-$ group are particularly preferred. The self-dispersible resin having at least one of such hydrophilic groups can be dispersed in water without using a dispersant or with only a slight amount thereof. An amount of the hydrophilic group contained in the self-dispersible resin is not particularly restricted, and an amount of the hydrophilic group contained in the self-dispersible resin is preferably, in a range of 0.001 mol to 0.050 mol, and more preferably 0.005 mol to 0.030 mol, based on 100 g of the self-dispersible resin. The self-dispersible resin can be produced by bonding a compound having a hydrophilic group and an unsaturated double bond (hereinafter, referred to as "hydrophilic group-containing compound) to resin. The hydrophilic group-containing compound can be bonded to resin according to a procedure such as a graft polymerization process or a block polymerization process. Furthermore, when the hydrophilic group-containing compound or the hydrophilic group-containing compound and a compound polymerizable therewith are polymerized, a self-dispersible resin can be produced.

Examples of the resins to which a hydrophilic group-containing compound is bonded include styrenic resins such as polystyrene, poly-α-methyl styrene, chloropolystyrene, styrene-chlorostyrene copolymer, styrene-propylene copolymer, styrene-butadiene copolymer, styrene-vinyl chloride copolymer, styrene-vinyl acetate copolymer, styrene-maleic acid copolymer, styrene-acrylic acid ester copolymer, styrene-methacrylic acid ester copolymer, styrene-acrylic acid ester-methacrylic acid ester copolymer, styrene-α-methyl chloroacrylate copolymer, styrene-acrylonitrile-acrylic acid ester copolymer and styrene-vinylmethyl ether copolymer, (meth)acrylic resin, polycarbonate, polyester, polyethylene, polypropylene, polyvinyl chloride, epoxy resin, urethane-modified epoxy resin, silicone-modified epoxy resin, rosin-modified maleic acid resin, ionomer resin, polyurethane, silicone resin, ketone resin, ethylene-ethyl acrylate copolymer, xylene resin, polyvinyl butyral, terpene resin, phenol resin, aliphatic hydrocarbon resin and alicyclic hydrocarbon resin.

As the hydrophilic group-containing compound, for instance, an unsaturated carboxylic acid compound and an unsaturated sulfonic acid compound can be cited. Examples of the unsaturated carboxylic acid compounds include unsaturated monocarboxylic acids such as (meth)acrylic acid, crotonic acid, and isocrotonic acid; unsaturated dicarboxylic acids such as maleic acid, fumaric acid, tetrahydrophthalic acid, itaconic acid and citraconic acid; acid anhydrides such as maleic anhydride and citraconic anhydride; and alkyl esters, dialkyl esters, alkali metal salts, alkaline earth metal salts and ammonium salts thereof Examples of the unsaturated sulfonic acid compounds include styrene sulfonic acids, sulfoalkyl(meth)acrylates, metal salts and ammonium salts thereof. The hydrophilic group-containing compounds can be used singularly or in a combination of at least two kinds thereof. Furthermore, as monomer compounds other than the hydrophilic group-containing compounds, for instance, sulfonic acid compounds can be used. Examples of the sulfonic acid compounds include sulfoisophthalic acid, sulfoterephthalic acid, sulfophthalic acid, sulfosuccinic acid, sulfobenzoic acid, sulfosalicylic acid, metal salts and ammonium salts thereof.

Furthermore, among the synthetic resins, in view of easy applicability of a granulation operation to resin fine particles, kneadability of additives in the synthetic resin and more homogenizing shapes and magnitudes of the resin fine particles, synthetic resin having the softening temperature of 150° C. or less is preferred and synthetic resin having the softening temperature of 60° C. to 150° C. is particularly preferred. Still furthermore, among these, synthetic-resin having a weight average molecular weight of 5,000 to 500,000 is preferred. The synthetic resins can be used singularly or in a combination of at least two different kinds thereof. Furthermore, in the case of the same resin, a plurality of kinds different in any one or in all of a molecular weight and a monomer composition can be used.

Synthetic resin used in the invention may contain at least one kind of general additives for synthetic resins. Specific examples of the additives for synthetic resins include variously shaped (particulate, fibrous or flake-like) inorganic fillers, a colorant, an anti-oxidizing agent, a mold releaser, an antistatic agent, a charge control agent, a lubricant, a heat stabilizer, a flame retarder, an anti-drip agent, a UV absorber, a light stabilizer, a light-shielding agent, a metal inactivator, an anti-aging agent, a plasticizer, an impact strength improver and a compatible agent.

[Coarse Particle Slurry Preparing Stage S1$b$]

In the coarse particle slurry preparing stage S1$b$, the synthetic resin coarse particles obtained in the coarse particle preparing stage S1$a$ is mixed with liquid so that the synthetic resin coarse particles are dispersed in the liquid, whereby coarse particle slurry is prepared. The liquid mixed with the synthetic resin coarse particles is not particularly restricted as far as the liquid matter does not dissolve but can uniformly disperse the synthetic resin coarse particles. However, when easiness in the process management, waste liquid disposal after all steps and handling easiness are considered, water is preferred and water containing a dispersion stabilizer is further preferred. The dispersion stabilizer is preferred to add in water before the synthetic resin coarse particles are added in water.

As the dispersion stabilizer, ones usually used in the field can be used. Among these, a water-soluble polymeric dispersion stabilizer is preferred. Examples of the water-soluble polymeric dispersion stabilizer include (meth)acrylic polymer, polyoxyethylene polymer, cellulose polymer, polyoxyalkylene alkylarylether sulfate salt, and polyoxyalkylene alkylether sulfate salt. The (meth)acrylic polymer includes one or two hydrophilic monomers selected from: acrylic monomers such as (meth)acrylic acid, α-cyanoacrylate, α-cyanomethacrylate, itaconic acid, crotonic acid, fumaric acid, maleic acid, and maleic acid anhydride; hydroxyl-containing acrylic monomers such as β-hydroxyethyl acrylate, β-hydroxyethyl methacrylate, β-hydroxypropyl acrylate, β-hydroxypropyl methacrylate, γ-hydroxypropyl acrylate, γ-hydroxypropyl methacrylate, 3-chloro-2-hydroxypropyl acrylate, and 3-chloro-2-hydroxypropyl methacrylate; ester monomers such as diethylene glycol monoacrylic ester, diethylene glycol monomethacrylic ester, glycerine monoacrylic ester, and glycerine monomethacrylic ester; vinyl alcohol monomers such as N-methylol acrylamide and N-methylol methacrylamide; vinylalkylether monomers such as vinylmethylether, vinylethylether, and vinylpropylether; vinylalkylester monomers such as vinyl acetate, vinyl propionate, and vinyl butyrate; aromatic vinyl monomers such as styrene, α-methylstyrene, and vinyl toluene; amide monomers such as acrylamide, methacrylamide, diacetone acrylamide, and methylol compounds thereof; nitrile monomers such as acrylonitrile and methacrylonitorile; acid chloride monomers such as chloride acrylate and chloride methacrylate; vinyl nitrogen-containing heterocyclic monomers such as vinylpyridine, vinylpyrrolidone, vinylimidazole, and ethyleneimine; and cross-linking monomers such as ethyleneglycol dimethacrylate, diethyleneglycol dimethacrylate, allyl methacrylate, and divinylbenzene. The polyoxyethylene polymer includes polyoxyethylene, polyoxypropylene, polyoxyethylene alkylamine, polyoxypropylene alkylamine, polyoxyethylene alkylamide, polyoxypropylene alkylamide, polyoxyethylene nonylphenylether, polyoxyethylene laurylphenylether, polyoxyethylene stearylphenylester, and polyoxyethylene nonylphenylester. The cellulose polymer includes methylcellulose, hydroxyethylcellulose, and hydroxypropylcellulose. The polyoxyalkylene alkylarylether sulfate salt includes sodiumpolyoxyethylene laurylphenylether sulfate, potassium polyoxyethylene laurylphenylether sulfate, sodium polyoxyethylene nonylphenylether sulfate, sodium polyoxyethylene oleylphenylether sulfate, sodium polyoxyethylene cetylphenylether sulfate, ammonium polyoxyethylene laurylphenylether sulfate, ammonium polyoxyethylene nonylphenylether sulfate, and ammonium polyoxyethylene oleylphenylether sulfate. The polyoxyalkylene alkylether sulfate salt includes sodium polyoxyethylene laurylether sulfate, potassium polyoxyethylene laurylether sulfate, sodium polyoxyethylene oleylether sulfate, sodium-polyoxyethylenecetylether sulfate, ammonium polyoxyethylene laurylether sulfate, and ammonium polyoxyethylene oleylether sulfate.

The dispersion stabilizers can be used singularly or in a combination of at least two kinds thereof. When the aqueous slurry of resin fine particles obtained by use of an anionic dispersant described below as the dispersion stabilizer is used per se to prepare aggregated particles, the anionic dispersant will not have to be added in the aggregating stage S2 of the method of preparing aggregated particles. An addition amount of the dispersion stabilizer is, though not particularly restricted, based on a total amount of the coarse particle slurry, preferably in a range of 0.05% by weight to 10% by weight, and more preferably of 0.1% by weight to 3% by weight.

In the coarse particle slurry, together with the dispersion stabilizer, a viscosity improver and a surfactant may be added. The viscosity improver is effective, for instance, when the coarse particles are further particularized. The surfactant can further improve for instance the dispersibility of the synthetic resin coarse particles to water. As the viscosity improver, a polysaccharide base viscosity improver selected from synthetic polymer polysaccharides and natural polymer polysaccharides is preferred. As the synthetic polymer polysaccharides, known ones can be used. For instance, cationized cellulose, hydroxyethyl cellulose, starch, ionized starch derivatives and block polymers of starch and synthetic polymer can be cited. As the natural polymer polysaccharides, hyaluronic acid, carrageenan, locust beam gum, xantan gum, guar gum and gelan gum can be cited. The viscosity improvers can be used singularly or in a combination of at least two kinds thereof. An addition amount of the viscosity improver is, though not particularly restricted, preferably 0.01% by weight or more and 2% by weight or less based on a total amount of the coarse particle slurry. As the surfactant, sulfosuccinic acid ester salts such as disodium sulfosuccinic acid lauryl, disodium polyoxyethylene sulfosuccinic acid lauryl, disodium polyoxyethylene alkyl (C12 through C14) sulfosuccinate, disodium sulfosuccinic acid polyoxyethylene lauroyl ethanolamide and sodium sulfosuccinic acid dioctyl can be cited. The surfactants can be used singularly or in a combination of at least two kinds thereof. An addition amount of the surfactant is, though not particularly restricted, preferably in a range of 0.05% by weight to 0.2% by weight based on a total amount of the coarse particle slurry.

When the synthetic resin coarse particles and liquid are mixed, a general purpose mixer can be used and thereby coarse particle slurry can be obtained. Here, an addition amount of the synthetic resin coarse particles to the liquid is, though not particularly restricted, preferably 3% by weight or more and 45% by weight or less, and more preferably 5% by weight or more and 30% by weight or less based on a total amount of the synthetic resin coarse particles and the liquid. Furthermore, the mixing of the synthetic resin coarse particles and liquid may be carried out under heating or under cooling. However, the mixing is usually carried out under room temperature. As the mixer, for instance, Henschel type mixers such as Henschel Mixer (trade name, produced by Mitsui Mining Co., Ltd.), Super Mixer (trade name, produced by Kawata Co., Ltd.) and Mechanomill (trade name, produced by Okada Seiko Co., Ltd.), Angmill (trade name, produced by Hosokawa Micron Corporation), Hybridization System (trade name, produced by Nara Machinery Co., Ltd.) and Cosmo System (trade name, produced by Kawasaki Heavy Industry Ltd.) can be cited. Thus obtained coarse particle slurry may be supplied per se to the pulverizing stage S1c. However, as a pre-treatment, a general pulverization process maybe applied and thereby particle diameters of the synthetic resin coarse particles may be pulverized to substantially 100 μm and more preferably to 100 μm or less before the coarse particle slurry is supplied to the pulverizing stage S1c. The pulverization process as the pretreatment is carried out by passing the coarse particle slurry through a general pressure-proof nozzle under high pressure. The coarse particle slurry prepared in the present stage is supplied to the tank 2 of the high-pressure homogenizer 1 for pulverization use.

[Pulverizing Stage S1c]

In the pulverizing stage S1c, the coarse particle slurry obtained in the coarse slurry preparing stage S1b is pulverized under heat and pressure to obtain aqueous slurry of resin fine particles. When the coarse particle slurry is heated and pressurized, the pressure unit 4 and heater 5 in the high-pressure homogenizer 1 for pulverization use are used. When the coarse particles are pulverized, the pulverizing nozzle 6 in the high-pressure homogenizer 1 for pulverization use is used. The heating and pressurizing conditions of the coarse particle slurry are not particularly restricted, and the coarse particle slurry is preferably pressurized at from 50 MPa to 250 MPa and heated at a temperature of 50° C. or more, more preferably pressurized at from 50 MPa to 250 MPa and heated at a temperature equal to or higher than the softening temperature of the synthetic resin contained in the coarse particles, and particularly preferably pressurized at from 50 MPa to 250 MPa and heated at a temperature in the range of from the softening temperature of the synthetic resin contained in the coarse particles to Tm+25° C. (Tm: the softening temperature in a flow tester of the synthetic resin). Here, when the coarse particles contain at least two kinds of the synthetic resins, both the softening temperature of the synthetic resin and the softening temperature in the flow tester are values of the synthetic resin that has the highest softening temperature or softening temperature in the flow tester. When the pressure is less than 50 MPa, since the shearing energy becomes smaller, there is fear that the pulverization may not be sufficiently forwarded. When the pressure exceeds 250 MPa, the dangerousness becomes too large in an actual production line to be practical. The coarse particle slurry is introduced, under pressure and temperature within the above ranges, from an inlet of the pulverizing nozzle 6 inside of the pulverizing nozzle 6. The aqueous slurry exhausted from the outlet of the pulverizing nozzle 6, for instance, contains resin fine particles, is discharged while heated at a temperature of from 60° C. to Tm+60° C. (Tm: same as above) and pressurized at substantially 5 MPa to 80 MPa.

[Depressurizing Stage S1d]

In the depressurizing stage S1d, the aqueous slurry of resin fine particles, which is obtained in the pulverizing stage S1c in a heated and pressurized state, while maintaining in a state where the bubbling is not caused, is depressurized to atmospheric pressure or pressure close thereto. When the depressurization is applied, the depressurizing module 7 in the high-pressure homogenizer 1 for pulverization use is used. The aqueous slurry after the depressurizing stage S1d, for instance, contains resin fine particles and the liquid temperature thereof is in the range of substantially 60° C. to Tm+60° C. In the invention, Tm is the softening temperature of the resin fine particles. In the invention, the softening temperature of the resin fine particles is measured by use of a flow tester (trade name: Flow Tester CFT-100C, produced by Shimadzu Corporation). The flow tester (Flow Tester CFT-100C) is set so that when weight of 10 kgf/cm$^2$(9.8×10$^5$ Pa) is applied, 1 g of sample (resin fine particles) may be pushed out of a die (nozzle, aperture: 1 mm, length: 1 mm), followed by heating at a temperature-up speed of 6° C. per minute to obtain a temperature when one half the sample flows out of the die, and the temperature is taken as the softening temperature. Furthermore, the glass transition temperature (Tg) of synthetic resin is obtained as follows. By use of a differential scanning calorimeter (trade name: DSC220, produced by Seiko Electronics Co., Ltd.), in accordance with JIS K 7121-1987, 1 g of a sample (carboxyl group-containing resin or aqueous resin) is heated at a temperature-up speed of 10° C. per min to measure a DSC curve. A temperature at an intersection of a straight line obtained by extending a base line on a high temperature side of an endothermic peak corresponding to the glass transition of the obtained DSC curve to a low temperature side and a tangent line drawn at a point where a gradient may be maximum to a curve from a rising point to an apex of the peak is obtained as the glass transition temperature (Tg).

[Cooling Stage S1e]

In the cooling stage S1e, the aqueous slurry of resin fine particles that is depressurized in the depressurizing stage S1d and at a liquid temperature in the range of substantially 60° C. to Tm+60° C. is cooled to slurry of a temperature of substantially 20° C. to 40° C. For the cooling operation, the cooler 8 of the high-pressure homogenizer 1 for pulverization use is employed.

It is thus possible to obtain an aqueous slurry that contains resin fine particles. The aqueous slurry per se can be used to prepare aggregated particles. Furthermore, when the resin fine particles are separated from the aqueous slurry, the resin fine particles can be newly slurried and used as a raw material of aggregated particles. When the resin fine particles are separated from the aqueous slurry, a general separator such as a filter and a centrifugal separator can be used. In the embodiment, when the coarse particle slurry flows through the pulverizing nozzle 6, a temperature and/or pressure applied to the coarse particle slurry, a concentration of the coarse particle in the coarse particle slurry, and the number of times of pulverization are appropriately controlled, particle diameters of obtained resin fine particles can be controlled. The number of times of pulverization is adjusted depending on the number of the pulverizing nozzles coupled to the piping and the number of the collision walls of the pulverizing nozzles. In the invention, when considering that resin fine particles are aggregated to obtain aggregated particles having an appropriate volume average particle diameter, the respective conditions are controlled so that a volume average particle diameter of the resin fine particles may be preferably 3 μm or less and more preferably 0.4 μm and more and 3 μm or less.

In the description, a volume average particle diameter and a coefficient of variation (CV value) are values obtained as follows. A measurement sample is prepared in such a manner that to 50 ml of an electrolyte solution (tradename: ISOTON-II, produced by Beckmann/Coulter Corp.), 20 mg of a sample and 1 ml of sodium salt of alkylether sulfuric acid ester are added, followed by dispersing by use of an ultrasonic dispersion machine (trade name: UH-50, produced by STM Co.) at an ultrasonic frequency of 20 Hz for 3 min. The measurement sample is measured by use of a particle size distribution analyzer (trade name; Multisizer 3, produced by Beckmann/Coulter Co.) under conditions of aperture diameter: 20 μm and number of measured particles: 50000 counts and, from a volume particle size distribution of the sample particles, a volume average particle diameter and a standard deviation in the volume particle size distribution are obtained. The coefficient of variation (CV value, %) is obtained based on an equation below.

CV value (%)=(standard deviation in volume particle size distribution/volume average particle diameter)×100

[Aggregating Step S2]

In the present step, the aqueous slurry of resin fine particles prepared in the resin fine particle-containing aqueous slurry preparing step S1 flows through a coiled piping under heat and pressure, whereby the resin fine particles aggregate to result in aqueous slurry of aggregated particles (unless otherwise stated, hereinafter, referred to as "aggregated particle slurry"). A concentration of the resin fine particles in the resin fine particle slurry is, though not particularly restricted, based on a total amount of the resin fine particle slurry, preferably in a range of from 2% by weight to 40% by weight, and more preferably 5% by weight to 20% by weight. When the concentration is less than 2% by weight, an aggregation force of the resin fine particles becomes smaller, which may cause difficulty in controlling a particle diameter. When the concentration exceeds 40% by weight, there is fear that the resin fine particles may be excessively aggregated.

To the resin fine particle slurry, the cationic dispersant and an anionic dispersant may be added. The cationic dispersant and the anionic dispersant are preferably added to the resin fine particle slurry when synthetic resin that is a matrix component of the resin fine particle is resin other than self-dispersible resin. The anionic dispersant enhances the dispersibility of the resin fine particles in water. The cationic dispersant electrically neutralizes the anionic dispersant which therefore loses dispersion stability, thus causing heteroaggregation of the resin fine particles. That is to say, in the invention, the cationic dispersant acts as an aggregating agent. Accordingly, when an anionic dispersant is added to the resin fine particle slurry followed by adding a cationic dispersant, the resin fine particles are smoothly aggregated and inhibited from being excessively aggregated, and thereby aggregated particles narrow in the particle size distribution can be produced at high yield.

The anionic dispersant may be added to the aqueous slurry of resin fine particles in the aggregating step or may be added in the above-described coarse particle slurry preparing stage S1b. In the case where the anionic dispersant is added in the aqueous slurry preparing step and the cationic dispersant is added in the aggregating step, the resin fine particles are dispersed and stabilized in the aqueous slurry with the aid of the anionic dispersant in the aqueous slurry preparing step and then, in the aggregating step, the cationic dispersant having charges opposite to those of the anionic dispersant is used to destabilize the anionic dispersant, thereby aggregating the resin fine particles.

Known cationic dispersants can be used, and preferred examples thereof include, for example, alkyltrimethyl ammonium cationic dispersant, alkylamide amine cationic dispersant, alkyldimethyl benzyl ammonium cationic dispersant, cationized polysaccharide cationic dispersant, alkylbetaine cationic dispersant, alkylamide betaine cationic dispersant, sulfobetaine cationic dispersant, and amine oxide cationic dispersant. Among these, alkyltrimethyl ammonium cationic dispersant is further preferred. Specific examples of the alkyltrimethyl ammonium cationic dispersant include, for instance, stearyl trimethyl ammonium chloride, tri(polyoxyethylene)stearyl ammonium chloride, and lauryl trimethyl ammonium chloride. The cationic dispersants can be used singularly or in a combination of at least two kinds thereof. The cationic dispersant is, for instance, added to the aqueous slurry of resin fine particles. An addition amount of the cationic dispersant is not particularly restricted, and the addition amount is preferably in a range of 0.1% by weight to 5% by weight based on a total amount of the resin fine particle slurry. When the addition amount is less than 0.1% by weight, the cationic dispersant insufficiently exhibits its ability to weaken the dispersibility of the resin fine particles, which may lead to insufficient aggregation of the resin fine particles. When the addition amount exceeds 5% by weight, a dispersion effect of the cationic dispersant comes to appear, which may lead to the insufficient aggregation.

Known anionic dispersants can be used, and preferred examples thereof include a sulfonic acid anionic dispersant, a sulfuric acid ester anionic dispersant, a polyoxyethylene ether anionic dispersant, a phosphoric acid ester anionic dispersant and a polyacrylic acid salt. Specific examples of the anionic dispersants preferably include sodium dodecylbenzene sulfonate, sodium polyacrylate and polyoxyethylene phenyl ether. The anionic dispersants can be used singularly or in a combination of at least two kinds thereof. An addition amount of the anionic dispersant is not particularly restricted, and the addition amount is preferably in a range of 0.1% by weight to 5% by weight based on a total amount of the resin fine particle slurry. When the addition amount is less than 0.1% by weight, the resin fine particles cannot be sufficiently dispersed by use of the anionic dispersant and there is fear that the excessive aggregation may occur. When the addition amount exceeds 5% by weight, an obtained dispersion effect is not higher than a dispersion effect obtained in the case where the addition amount of the dispersant is in a range of 0.1% by weight to 5% by weight. Conversely, the viscosity of the resin fine particle slurry becomes higher, which deteriorates the dispersibility of the resin fine particles. As the result, the excessive aggregation tends to occur.

Furthermore, a usage ratio of the cationic dispersant and the anionic dispersant is not particularly restricted as far as the usage ratio is an extent that can lower the dispersion effect of the anionic dispersant owing to an addition of the cationic dispersant. However, when easiness of particle diameter control of the aggregated particles, easiness of occurrence of the aggregation, inhibition of occurrence of the excessive aggregation and further narrowing of a particle size distribution width of the aggregated particles are considered, the anionic dispersant and the cationic dispersant are used at a ratio by weight ratio preferably in the range of 10:1 to 1:10, more preferably in the range of 10:1 to 1:3 and most preferably in the range of 5:1 to 1:2. Note that the anionic dispersant may be added to the coarse particle slurry in the stage for preparing the coarse particle slurry.

The resin fine particle slurry is heated preferably at a temperature of the glass transition temperature of the resin fine particle or more and the softening temperature (° C.) of the resin fine particle or less, and more preferably 60° C. to 90° C., and pressurized preferably at pressure of 5 MPa to 100 MPa, and more preferably at pressure of 5 MPa to 20 MPa. When the resin fine particle slurry is heated at a temperature of a glass transition temperature of resin fine particles or more and a softening temperature thereof or less and pressurized at pressure of 5 MPa to 100 MPa, it is possible to obtain the aggregated particles in a short time at high yield without the excessive aggregation of the resin fine particles. When the fine resin particle slurry is heated at a temperature of 60° C. to 90° C. and pressurized at pressure of 5 MPa to 20 MPa, it is possible to obtain the aggregated particles in a short time at higher yield without the excessive aggregation of the resin fine particles. When the heating temperature is less than the glass transition temperature of the resin fine particles, the resin fine particles aggregate with difficulty and there is fear that the yield of the aggregated particles is deteriorated. When the heating temperature exceeds the softening temperature of the resin fine particles, the excessive aggregation occurs to be difficult to control the particle size. When the applied pressure is less than 5 MPa, the resin fine particle slurry cannot smoothly flow through the coiled piping. When the applied pressure exceeds 100 MPa, the resin fine particles become very difficult to aggregate.

The coiled piping through which the resin fine particle slurry flows is a member that a pipe-like piping having a flow path therein is wound in coil, i.e., in spiral. The coiled piping may be the same as that used in the heater 5 shown in FIG. 6. Note that the heater 5 used in the resin fine particle-containing aqueous slurry preparing step S1 is not restricted to the coiled piping 50 and may include heaters of various shapes. The number of windings of the coiled piping 50 is preferably in a range of 1 to 200, more preferably 25 to 60, and particularly preferably 15 to 35. When the number of windings of the coil is less than 1, not the resin fine particles but aggregated particles having appropriate particle diameters are aggregated to result in generating coarse particles. When the number of windings of the coil exceeds 200, a length of time during which the centrifugal force is applied becomes longer, and it thus becomes difficult to control the particle diameters. As the result, the yield of the aggregated particles having appropriate particle diameters is deteriorated. When the number of windings of the coil is in the range of 1 to 200, the particle diameter can be easily controlled and thereby the aggregated particles homogeneous in shape and particle diameter can be obtained at higher yield. When the number of windings of the coil is in the range of 15 to 35, the particle diameter can be particularly easily controlled and thereby the aggregated particles homogeneous in shape and particle diameter can be obtained at higher yield.

Furthermore, a coil radius in one coil is, though not particularly restricted, preferably in a range of 25 mm to 200 mm, and particularly preferably 30 mm to 80 mm. When the coil radius is less than 25 mm, an angular velocity in a flow path in the coiled piping becomes dominant, that is to say, a circular motion becomes dominant, and thereby the resin fine particles tend to be stably and unevenly located on an inner wall surface of the flow path and in the neighborhood of the inner wall. As the result, the resin fine particles tend to excessively aggregate, which makes it difficult to control the particle diameter and which lowers the yield of the aggregated particles having appropriate particle diameters. When the coil radius exceeds 200 mm, the centrifugal force becomes larger in the flow path, which makes it difficult to generate a turbulent flow resulting from the centrifugal force and the shearing force, and which decreases the chance of collision of resin fine particles each other, so that the resin fine particles are less easily aggregated. As the result, it becomes harder to control the particle diameter, and the yield of the aggregated particles having appropriate particle diameters is decreased.

Further, a pitch angle is preferably in a range of 10° to 30°. The pitch angle indicates an angle formed between a plane perpendicular to the free height of the coiled piping 50, and the coiled piping 50 in FIG. 6. That is to say, the pitch angle represents tilt of the coiled piping 50. When the pitch angle is smaller than 10°, a space between the adjacent coils is so small that the amount of heating medium which flow through the space between the adjacent coils in the coiled piping 50 is smaller than that of heating medium which flows along an outer or inner circumferential surface of the coiled piping 50 and the variation in temperature of the resin fine particle slurry which flows through the coiled piping 50 occurs. When the pitch angle exceeds 30°, it is hard to obtain sufficient centrifugal force, and the whole coil is too long to be handled as a heater with ease. The whole coil means a length of the entire pipe-like member.

Figure 8A:
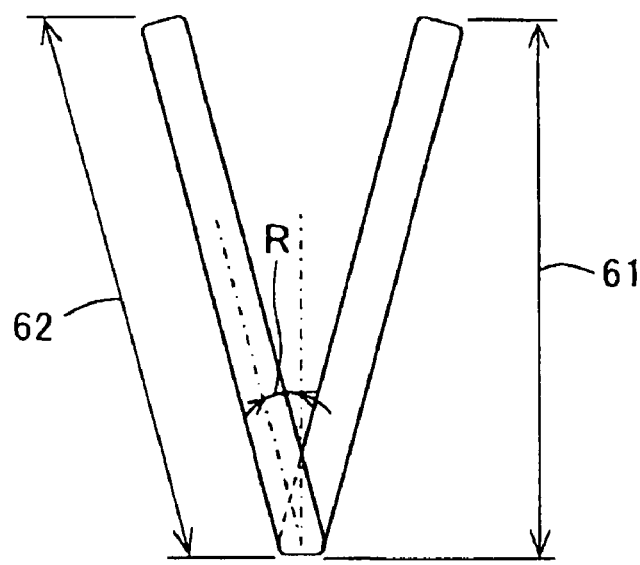
FIGS. 8A and 8B are views for explaining how to determine a ½ coil pitch and an entire length of a coil.
Figure 8B:
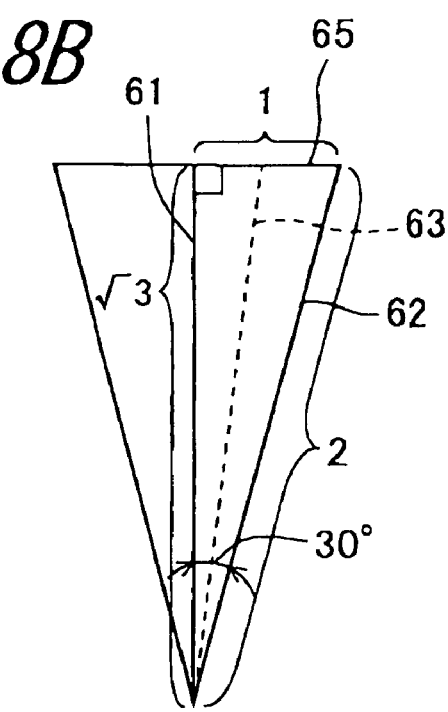

FIGS. 8A and 8B are views for explaining how to determine a ½ coil pitch 60 and an entire length of the coil. The ½ coil pitch 60 and an entire length of the coil can be determined based on a coil curvature radius 54, the number of windings, and the pitch angle, of the coiled piping 50. In FIG. 7A, the entire length of the coil can be determined using the coil curvature radius 54, the number of windings, and the tilt ratio.

(Entire length of coil)=2π×(Coil curvature radius)× (the number of windings)×(Tilt ratio)

The tilt ratio indicates a ratio of the actual coil height 62 to the perpendicular oriented height 61. The tilt ratio is determined in the following formula.

(Tilt ratio)=(Actual coil height)/(Perpendicular oriented height)

When the coiled piping 50 has a pitch angle R of 30°, the coil curvature radius of 40 mm, and 50 windings, the ½ coil pitch 60 and the entire length of the coil can be determined as follows. Note that the pitch angle R represents the pitch angle of the coiled piping 50.

In FIG. 8B, a right triangle is defiled by the perpendicular oriented height 61, the actual coil height 62, and a base 65 which is a line for connecting the perpendicular oriented height 61 and the actual coil height 62. In such a right triangle, the base 65 is evenly divided into two parts as shown by a dotted line 63, resulting in right triangles, each having an acute angle of 15°. Three sides of a thus-obtained right triangle are defined as $0.5:\sqrt{3}:1.8$, arranged from the shortest.

The actual coil height 62 is twice the coil curvature radius, that is, 40×2, and when the ½ coil pitch is represented by x, the value x is determined as follows.

$$\sqrt{3}:0.5=40\times 2:x$$

$$x=11.5\ (mm)$$

The tilt ratio is $(1.8/\sqrt{3})$. The entire length of the coil is determined as follows.

Entire length of coil=$2\times\pi\times 40\times 50\times 1.8/\sqrt{3}$=26105.4 (mm)

The reason why the aggregation occurs when the resin fine particle slurry flows through the coiled piping under heat and pressure is not sufficiently clear. However, the reason is considered as follows. The resin fine particle slurry flows while forming a laminar flow in a flow path of a straight piping. In the laminar flow, at a center of the flow path, particles large in particle diameter substantially regularly flow and, in the neighborhood of an inner wall surface of the flow path, particles small in particle diameter substantially regularly flow. At that time, since there is no turbulence in the flow, particles collide less frequently therebetween, resulting in hardly causing the aggregation. On the other hand, when the resin fine particle slurry is introduced in a flow path of a coiled piping, in the neighborhood of an inner wall surface of the flow path, the centrifugal force directed outside of the flow path becomes stronger. On the other hand, at the center of the flow path, the centrifugal force and the shearing force are applied, which generate a turbulent flow. Particles large in the particle diameter group together owing to the centrifugal force in the neighborhood of the inner wall surface of the flow path. Since the centrifugal force is strong, without showing irregular behavior, the particles large in the particle diameter flow substantially regularly, the particles collide less frequently with each other, resulting in difficulty of aggregating. On the other hand, particles small in the particle diameter (or mass) like the resin fine particles flow involved in a turbulent flow at the center portion of the flow path; accordingly, the number of times of collision between particles increases to result in frequent aggregation. Then, when aggregated particles grow to an appropriate magnitude, the aggregated particles are driven owing to the centrifugal force to the neighborhood of an inner wall surface of the flow path, and the resin fine particles are thus prevented from being excessively aggregated. Thus, while the coarse particles due to the excessive aggregation are inhibited from generating as far as possible, only resin fine particles can be selectively aggregated.

[Depressurizing Step S3]

In the depressurizing step S3, bubbles are removed from surfaces of the aggregated particles in the aggregated particle slurry that is obtained in the aggregating step S2 and in a heated and pressurized state, and at the same time, the aggregated particle slurry is depressurized to atmospheric pressure or pressure close thereto so that the bubbling due to the bumping may not occur. In parallel with the depressurization, the particle diameters are controlled. In the particle diameter control, mainly, coarse particles are particularized in the particle diameter. Accordingly, the depressurized aggregated particle slurry, with hardly containing coarse particles, contains aggregated particles substantially homogeneous in the shape and particle diameter and a liquid temperature thereof is in the range of substantially 50° C. to 80° C.

Figure 9:
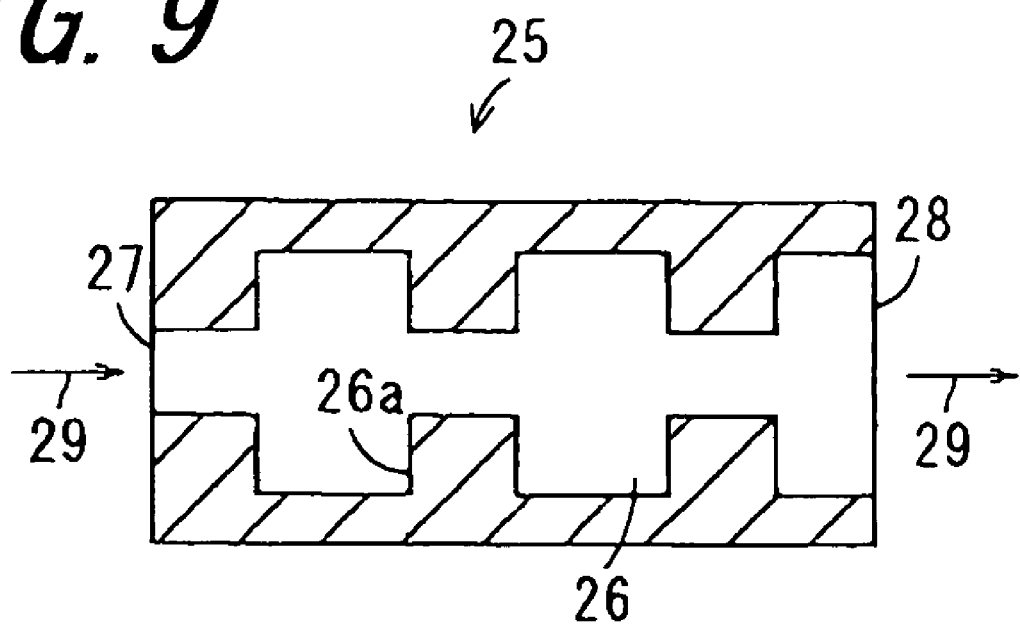
FIG. 9 is a longitudinal sectional view schematically showing a configuration of a depressurizing nozzle.

The aggregated particle slurry is depressurized by use of, for instance, a depressurizing nozzle. As the depressurizing nozzle, a depressurizing nozzle 25 shown, for instance, in FIG. 9 can be used. FIG. 9 is a longitudinal sectional view schematically showing a configuration of the depressurizing nozzle 25. In the depressurizing nozzle 25, a flow path 26 is formed so as to penetrate through the inside thereof in a longer direction. One end of the flow path 26 in a longer direction is an inlet 27 and the other end thereof is an outlet 28. The aggregated particle slurry in a heated and pressurized state is introduced from the inlet 27 inside of the depressurizing nozzle 25 and the aggregated particle slurry in a depressurized and heated state is exhausted from the outlet 28 outside of the depressurizing nozzle 25. The flow path 26 is formed so that an axis line in a longer direction thereof may coincide with an axis line in a longer direction of the depressurizing nozzle 25 and an outlet diameter may be larger than an inlet diameter. Furthermore, in the embodiment, the flow path 26 is formed so that a portion where across sectional diameter in a direction vertical to a slurry flow direction (direction shown with an arrow mark 29) is relatively smaller and a portion where a cross sectional diameter in a direction vertical to a slurry flow direction is relatively larger may be alternately connected. Still furthermore, the proximity of the inlet 27 of the flow path 26 is formed so as to be a portion of which sectional diameter is relatively smaller and the proximity of the outlet 28 is formed so as to be a portion of which cross sectional diameter is relatively larger.

When the aggregated particle slurry in a heated and pressurized state is introduced from the inlet 27 in the flow path 26 of the depressurizing nozzle 25, the slurry flows through the inside of the flow path 26 under reduced pressure. When the slurry flows through the depressurizing nozzle 25 under reduced pressure, the bubbles can be removed from the surfaces of the aggregated particles in the aqueous slurry of resin fine particles, with the result that the aggregated particles can be blended into an aqueous solution in the aqueous slurry, thus allowing to more effectively impart external force to the aggregated particles. Moreover, bumping is prevented from occurring and thus a turbulent flow resulting from the bumping can be prevented, so that the resin fine particles can be prevented from being excessively aggregated. Among the aggregated particles, only particles excessively large in the particle diameter come into contact with an inner wall surface 26a of the flow path 26, superfluous resin fine particles are dissociated to form aggregated particles of appropriate magnitude, followed by exhausting from the outlet 28. In the depressurizing nozzle 25, an outlet diameter of the flow path 26 is larger than an inlet diameter thereof. Accordingly, when the slurry comes into contact with the inner wall surface 26a, an appropriate shearing force is applied. As the result, only aggregated particles excessively large in the particle diameter (coarse particles) are subjected to particle diameter control so that the particle size distribution of the aggregated particles can be made narrower. On the other hand, when an inlet diameter is larger than an outlet diameter, a strong shearing force is applied Accordingly, not only from the aggregated particles excessively large in the particle diameter but also from the aggregated particles other than that, the resin fine particles are dissociated. As the result, a particle size distribution of the aggregated particles may become wider as compared to that exhibited before the entry of the aggregated particle slurry into the depressurizing nozzle.

In the embodiment, without restricting to the depressurizing nozzle 25, various kinds of depressurizing nozzles having a flow path that is formed so as to have an outlet diameter larger than an inlet diameter can be used. When the outlet diameter is formed larger than the inlet diameter, the aggregated particles appropriately pulverized in the depressurizing nozzle are inhibited from re-aggregating to form the coarse particles. FIGS. 7A and 7B are longitudinal sectional views schematically showing a configuration of a depressurizing nozzle 30 according to another embodiment. The depressurizing nozzle 30 has a flow path 31 formed so as to penetrate through the inside of the depressurizing nozzle 30 in a longer direction One end of the flow path 31 is an inlet 32 and the other end thereof is an outlet 33. The flow path 31 is formed so that an axis line in a longer direction thereof may coincide with an axis line in a longer direction of the depressurizing nozzle 30 and an outlet diameter may be larger than an inlet diameter. Furthermore, in the embodiment, the flow path 31 is formed so that a cross sectional diameter in a direction vertical to a slurry flow direction (direction shown with an arrow mark 34) may continually and gradually become larger from the inlet 32 toward the outlet 33. The depressurizing nozzle 30 has an advantage same as that of the depressurizing nozzle 25. Still furthermore, in the embodiment, without restricting to only the depressurizing nozzle, a depressurizing module 7 in the high-pressure homogenizer 1 for pulverization can be used as well.

In the embodiment, when a coiled piping and a depressurizing nozzle or a depressurizing module are alternately disposed in a multi-stage to repeatedly apply aggregation and depressurization, the shapes and particle diameters of aggregated particles are further homogenized.

[Cooling Step S4]

In the cooling step S4, the aggregated particle slurry that is obtained in the depressurizing step 33 and at a liquid temperature in the range of substantially 50° C. to 80° C. is cooled. When aggregated particles are separated from the aggregated particle slurry, as necessary, washed and dried, aggregated particles can be obtained. When the aggregated particles are separated, a general solid-liquid separator where filtration, centrifugal separation and decantation are applied can be adopted. When the aggregated particles are washed, un-aggregated resin fine particles, anionic dispersant and cationic dispersant are removed. For the washing, pure water of which electric conductivity is 20 µS/cm or less is used, for instance. The washing with pure water is repeatedly applied until the electric conductivity of washing water remaining after the aggregated particles and pure water are mixed and the aggregated particles are separated from the mixture becomes 50 µS/cm or less. When the aggregated particles are washed and dried, aggregated particles of the invention are obtained. The aggregated particles of the invention thus obtained preferably have a volume average particle diameter in the range of substantially 5 µm to 6 µm and are homogeneous in the shape and particle diameter and very narrow in the particle size distribution width. In order to obtain the aggregated particles of the invention, of which volume average particle diameter is in the range of substantially 5 µm to 6 µm, for instance, it is important to terminate the washing at an appropriate time. In the invention, immediately after the cooling step S4, a depressurizing step may be disposed. The depressurizing step is same as the depressurizing step S3.

The foregoing aggregating process of resin fine particles can be applied by use of a high-pressure homogenizer described in for instance WO 03/059497. FIGS. 8A and 8B are system diagrams schematically showing a configuration of a high-pressure homogenizer 35 for applying a method of manufacturing aggregated particles of the invention shown in FIG. 1 (hereinafter, referred to as "a high-pressure homogenizer for aggregation use). Since the high-pressure homogenizer 35 resembles the high-pressure homogenizer 1 for pulverization use shown in FIG. 3, corresponding portions are shown with the same reference numerals and descriptions thereof are omitted. The high-pressure homogenizer 35 is different from the high-pressure homogenizer 1 for pulverization use in that a pulverizing nozzle 6 is not contained, three depressurizing modules different from the depressurizing module 7, i.e., depressurizing modules 36, 38 and 39 are contained and a coiled piping 37 is contained. The high-pressure homogenizer 35 is a high-pressure homogenizer that does not pulverize but aggregates particles. The high-pressure homogenizer 35 includes a tank 2, a transfer pump 3, a pressure unit 4, a heater 5, a first depressurizing module 36, a coiled piping 37, a second depressurizing module 38, a cooler 8, a third depressurizing module 39, a piping 9 and an outlet port 10. In the high-pressure homogenizer 35, the tank 2, the transfer pump 3, the pressure unit 4, the heater 5, the first depressurizing module 36, the coiled piping 37, the second depressurizing module 38, the cooler 8 and the third depressurizing module 39 are connected in this order via the piping 9. In a system connected via the piping 9, the aqueous slurry of resin fine particles, which has been depressurized by the third depressurizing module 9, may be taken outside of the system from the outlet port 10 or may be returned once more to the tank 2 to repeat circulating in an arrow mark direction 11.

Figure 10:
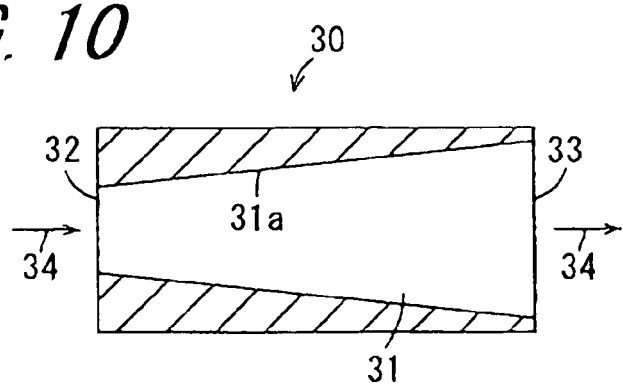
FIG. 10 is a longitudinal sectional view schematically showing a configuration of a depressurizing nozzle according to another embodiment.

As the tank 2, transfer pump 3 and pressure unit 4 are of the same configurations as those used in the high-pressure homogenizer 1 for pulverization use. Resin fine particle slurry in the tank 2 is supplied in a pressurized state by use of the transfer pump 3 and pressure unit 4 to the heater 5. The heater 5 is also of the same configuration of that used in the high-pressure homogenizer 1 for pulverization use. That is, the heater 5 shown in FIG. 6 is used which contains a coiled piping and a heater portion (not shown). Both ends of the coiled piping, respectively, are connected to the piping 9. The resin fine particle slurry, when flowed through the inside of the heater 5, is heated and pressurized and supplied to the first depressurizing module 36. As the first depressurizing module 36, for instance, a depressurizing nozzle is used. The depressurizing nozzle is a nozzle in which a flow path is formed so as to penetrate through the inside of the depressurizing nozzle in a longer direction. One end portion in a longer direction of the flow path is an inlet, the other end portion thereof is an outlet and an outlet diameter is formed so as to be larger than an inlet diameter. The inlet and outlet, respectively, are connected to the piping 9. Heated and pressurized slurry is introduced from the inlet in the flow path and depressurized slurry is exhausted from the outlet. As the depressurizing nozzle, for instance, a depressurizing nozzle 25 shown in FIG. 9 and a depressurizing nozzle 30 shown in FIG. 10 can be cited. Furthermore, in place of the depressurizing nozzle, the depressurizing module 7 in the high-pressure homogenizer 1 for pulverization use can be used as well. By means of the first depressurizing module 36, coarse particles generated in the heater 5 are pulverized. Inside of the coiled piping 37, resin fine particles are aggregated to obtain aggregated particle slurry. It is possible to use the coiled piping 37 which has the same configuration as that described above [aggregating step S2]. Inside of the second depressurizing module 38, the depressurizing step is carried out. That is, the aggregated particle slurry is depressurized and only coarse particles are selectively pulverized to control the particle diameter of the aggregated particles. In the cooler 8, the cooling step is carried out to cool the aggregated particle slurry. The cooler 8 being used is of the same configuration as that used in the high-pressure homogenizer 1 for pulverization use. The cooled aggregated particle slurry is subjected once more to particle diameter control in the third depressurizing module 39 and thereby aggregated particles of the invention are obtained.

In the high-pressure homogenizer 35, firstly, resin fine particle slurry fills up a tank 2 to which are then added a cationic dispersant and an anionic dispersant (or a cationic dispersant only in the case where an anionic dispersant is contained in the coarse particles in the coarse particle preparing stage S1b). A thus-obtained admixture is then introduced into a coiled piping of the heater 5, and heated and pressurized. Thereafter, coarse particles are disintegrated by use of the first depressurizing module 36 and then, centrifugal force and shearing force are added to the resin fine particles under heat and pressure by means of the coiled piping 37 to selectively aggregate the resin fine particles and thereby aggregated particle slurry is formed. The aggregated particle slurry is then introduced in the second depressurizing module 38 to depressurize and dissociate the resin fine particles from the aggregated particles having excessive particle diameter, and thereby particle diameters of the aggregated particles are homogenized. The aggregated particle slurry is subsequently introduced in the cooler 8 to cool, thereafter being subjected to the particle diameter control once more in the third depressurizing module 39. The aggregating step S2, the depressurizing step S3, and the cooling step S4 thus come to an end. A series of the steps may be repeatedly applied. In that case, the aggregated particle slurry obtained in the cooling step S13 is re-circulated to the tank 2 and processed again similarly.

Figure 12:
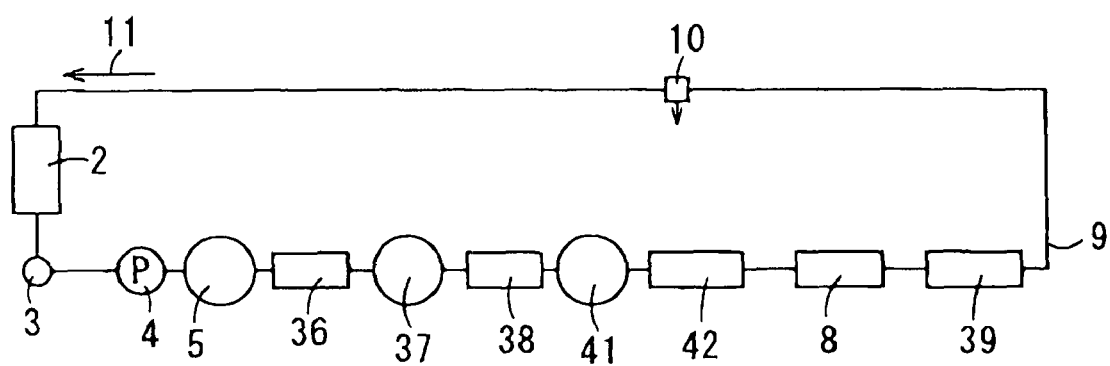
FIG. 12 is a system diagram schematically showing a configuration of a high-pressure homogenizer for aggregation use according to another embodiment.

FIG. 12 is a system diagram schematically showing a configuration of a high-pressure homogenizer 40 for aggregation use according to another embodiment. Since the high-pressure homogenizer 40 resembles the high-pressure homogenizer 35, the same reference numerals are imparted to corresponding portions and descriptions thereof will be omitted. The high-pressure homogenizer 40 is characterized in that between the second depressurizing module 38 and the cooler 8 in the high-pressure homogenizer 35 a coiled piping 41 and a depressurizing module 42 are disposed. The coiled piping 41 is of the same configuration as that described in a section of the aggregating step S2. The depressurizing module 42 is of the same configuration as the first depressurizing module 36. According to the high-pressure homogenizer 40, when, with a coiled piping and a depressurizing module as one set, a plurality of sets is disposed, the aggregation of the resin fine particles and the particle diameter control (reduction in diameter) of aggregated particles having excessive particle diameter can be repeatedly applied. Accordingly, particle diameters of the aggregated particles are further homogenized and thereby a particle size distribution width of the finally obtained aggregated particles can be further narrowed.

[Aggregated Particles]

The aggregated particles manufactured in the invention are aggregates of resin fine particles and preferably prepared by controlling particle diameters so that a volume average particle diameter may be in the range of 5 μm to 6 μm. When the aggregated particles having a volume-average particle diameter in the range of 5 μm to 6 μm are used as for instance a toner, an obtained toner will be excellent in preservation stability under heat, which toner is contained in a developer tank for storing a toner or storing toner and carrier inside an image forming apparatus. The toner is also favorable in image reproducibility and capable of stably forming a high quality image that is high in the density and definition and free from image defects. The aggregated particles having a volume average particle diameter of 5 μm to 6 μm can be obtained by aggregating the resin fine particles which are obtained in the above-described resin fine particle-containing aqueous slurry preparing step and whose volume average particle diameter is 3 μm or less, and more preferably in a range of 0.4 μm to 3 μm. When the volume average particle diameter of the resin fine particles is less than 0.4 μm, it takes a long time to attain a target particle diameter of the aggregated particle, which is inefficient. Furthermore, when the volume average particle diameter exceeds 3 μm, it becomes harder to obtain aggregated particles whose volume average particle diameter is substantially 5 μm to 6 μm and which are advantageous in reproducing an original image at high definition.

When finally obtained aggregated particles are used as a toner in the electrophotographic process, the use of polyesters among the above synthetic resins is preferred in the coarse particle preparing stage in the resin fine particle-containing aqueous slurry preparing step. The polyester is excellent in the transparency and can impart, to the aggregated particles, excellent powder fluidity, low temperature fixability and secondary color reproducibility. Accordingly, the polyester is suitable as a binding resin for color toners. Furthermore, polyester and acrylic resin may be graft polymerized.

When finally obtained aggregated particles are used as a toner, preferably, a colorant, a mold releaser and a charge control agent are incorporated in synthetic resin. The colorant, without particularly restricting, includes for instance an organic dye, an organic pigment, an inorganic dye and an inorganic pigment.

Examples of black colorants include carbon black, copper oxide, manganese dioxide, aniline black, activated carbon, nonmagnetic ferrite, magnetic ferrite and magnetite.

Examples of yellow colorants include chrome yellow, zinc yellow, cadmium yellow, yellow iron oxide, mineral fast yellow, nickel titanium yellow, navel yellow, naphthol yellow S, hansa yellow G, hansa yellow 10G, benzidine yellow G, benzidine yellow GR, quinoline yellow lake, permanent yellow NCG, tartrazine lake, C. I. Pigment Yellow 12, C. I. Pigment Yellow 13, C. I. Pigment Yellow 14, C. I. Pigment Yellow 15, C. I. Pigment Yellow 17, C. I. Pigment Yellow 93, C. I. Pigment Yellow 94 and C. I. Pigment Yellow 138.

Examples of orange colorants include red chrome yellow, molybdenum orange, permanent orange GTR, pyrazolone orange, Balkan orange, indathrene brilliant orange RK, benzidine orange G. indathrene brilliant orange GK, C. I. Pigment Orange 31 and C. I. Pigment Orange 43.

Examples of red colorants include colcothar, cadmium red, red lead, mercury sulfide, cadmium, permanent red 4R, lithol red, pyrazolone red, watching red, calcium salt, lake red C, lake red D, brilliant carmine 6B, eosin lake, rhodamine lake B, alizarin lake, brilliant carmine 3B, C. I. Pigment Red 2, C. I. Pigment Red 3, C. I. Pigment Red 5, C. I. Pigment Red 6, C. I. Pigment Red 7, C. I. Pigment Red 15, C. I. Pigment Red 16, C. I. Pigment Red 48:1, C. I. Pigment Red 53:1, C. I. Pigment Red 57:1, C. I. Pigment Red 122, C. I. Pigment Red 123, C. I. Pigment Red 139, C. I. Pigment Red 144, C. I. Pigment Red 149, C. I. Pigment Red 166, C. I. Pigment Red 177, C. I. Pigment Red 178 and C. I. Pigment Red 222.

Examples of purple pigment include manganese purple, fast violet B and methyl violet lake. Examples of blue colorants include iron blue, cobalt blue, alkali blue lake, victoria blue lake, phthalocyanine blue, metal-free phthalocyanine blue, phthalocyanine blue partial chlorination products, fast sky blue, indanthrene blue BC, C. I. Pigment Blue 15, C. I. Pigment Blue 15:2, C. I. Pigment Blue 15:3, C. I. Pigment Blue 16 and C. I. Pigment Blue 60.

Examples of green colorants include chrome green, chromium oxide, pigment green B, malachite green lake, final yellow green G and C. I. Pigment Green 7. Examples of white colorants include compounds such as zinc oxide, titanium oxide, antimony white and zinc sulfide. The colorants can be used singularly or in a combination of at least two kinds different in color. Furthermore, at least two kinds of colorants having the same color can be used. A content of a colorant in resin fine particles is, without particularly restricting, preferably 0.1% by weight or more and 20% by weight or less, and more preferably 0.2% by weight or more and 10% by weight or less, based on a total amount of the resin fine particles.

Examples of the mold releasers include, without particularly restricting, petroleum base waxes such as paraffin waxes and derivatives thereof and microcrystalline waxes and derivatives thereof; hydrocarbon base synthetic waxes such as Fischer-Tropsch waxes and derivatives thereof, polyolefin waxes and derivatives thereof, low molecular weight polypropylene waxes and derivatives thereof and polyolefin base polymer waxes (low molecular weight polyethylene waxes) and derivatives thereof; plant base waxes such as carnauba waxes and derivatives thereof, rice waxes and derivatives thereof, candelilla waxes and derivatives thereof and haze waxes; animal waxes such as bee waxes and whale waxes; oil and fat base synthetic waxes such as aliphatic acid amides and phenol fatty acid esters; long chain carboxylic acids and derivatives thereof; long chain alcohols and derivatives thereof; silicone base polymers; and higher fatty acids. The derivatives include oxides, block copolymers of a vinyl base monomer and wax and a graft modified matter of a vinyl base monomer and wax. Among these, preferable is a wax having a melting temperature equal to or higher than a liquid temperature of the aqueous slurry of resin fine particles in the above-described resin fine particle-containing aqueous slurry preparing step. A content of the mold releaser in the resin fine particles can be appropriately selected from a wide range without particularly restricting, and the content of the mold releaser is preferably in a range of 0.2% by weight to 20% by weight based on a total amount of the resin fine particles.

The charge control agent is not particularly restricted. A positive charge control agent and a negative charge control agent can be used. As the positive charge control agent, a basic dye, a quaternary ammonium salt, a quaternary phosphonium salt, aminopyrine, a pyrimidine compound, a polynuclear polyamino compound, aminosilane, a nigrosine dye and derivatives thereof, triphenylmethane derivatives, a guanidine salt and an amidine salt. Examples of the negative charge control agents include oil-soluble dyes such as oil black and spilon black; a metal-containing azo compound; an azo-complex dye; metal salt naphthenate; metal complexes and metal salts (metal includes chromium, zinc or zirconium) of salicylic acid and derivatives thereof; a fatty acid soap; a long chain alkylcarboxylate and a resin acid soap. The charge control agent can be used singularly or in a combination of at least two kinds thereof. A content of the charge control agent in the resin fine particles can be, without a particular restriction, appropriately selected from a wide range, and the usage amount is preferably in a range of 0.5% by weight to 3% by weight based on a total amount of resin fine particles.

When the aggregated particles manufactured by the invention are used as a toner in the electrophotographic process, an external additive maybe added to apply surface modification to the aggregated particles. As the external additive, ones normally used in the electrophotography field can be used. For instance, silica, titanium oxide, silicone resin, and silica and titanium oxide surface modified with a silane coupling agent can be cited. A usage amount of the external additive can be, without a particular restriction, appropriately selected from a wide range, and the usage amount is preferably in a range of 1 part by weight to 10 parts by weight based on 100 parts by weight of the aggregated particles.

When the aggregated particles of the invention are used as a toner in the electrophotographic process, any mode of a one-component developer and a two-component developer can be adopted. When the aggregated particles are used as the one-component developer, only the aggregated particles are used without using a carrier. The toner is frictionally charged by use of a blade and a fur brash at a developing sleeve so that the aggregated particles are attached onto the sleeve to be thereby conveyed, thus forming images. When the aggregated particles are used as the two-component developer, the aggregated particles and a carrier are used together. As the carrier, ones usually used in the electrophotography field can be used. For instance, ferrite that contains at least one kind selected from iron, copper, zinc, nickel, cobalt, manganese and chromium can be cited. On a surface of the carrier, a cover layer may be formed. As a material of the cover layer, for instance, polytetrafluoroethylene, monochlorotrifluoroethylene polymer, polyfluorinated vinylidene, silicone resin, polyester, metal salt of di-tert-butyl salicylate, styrenic resin, acrylic resin, polyamide, polyvinyl butyral, nigrosine, aminoacrylate resin, basic dye, basic dye lake, silica powder and alumina powder can be cited. A material of the cover layer is appropriately selected depending on components contained in the aggregated particles. The materials of the cover layer may be used singularly or in a combination of at least two kinds thereof. An average particle diameter of the carrier is preferably in a range of 10 µm to 100 µm, and more preferably 20 µm to 50 µm.

EXAMPLES

In what follows, the invention will be specifically described with reference to examples and comparative examples. In what follows, unless otherwise stated, "part" means "part by weight" and "%" means "% by weight".

Volume average particle diameters of toner, coefficients of variation CVs, and toner resistances Rts were measured as follows.

(Volume Average Particle Diameter and Coefficient of Variation CV)

A sample of 20 mg and sodium arkylether sulfate (AES) (dispersant manufactured by Kishida Chemical Co., Ltd) of 1 ml were added to an electrolyte (trade name: ISOTON-II, manufactured by Beckman Coulter K.K) of 50 ml, and the mixture was treated with ultrasonic dispersion having an ultrasonic frequency of 20 kHz for 3 minutes by using an ultrasonic disperser (trade name: UH-50, manufactured by STM Corp.) to produce a measurement sample. A volume particle size distribution of particles of the measurement sample was measured by using a particle size distribution measurement device (trade name: Multisizer 3, manufactured by Beckman Coulter K.K) under a condition of an aperture diameter of 20 μm and a measurement particle number of 50,000 counts, and based on the measurement result a particle diameter $d_{50}$ was measured, with which an accumulated volume from a large particle diameter side in an accumulated volume distribution becomes 50%.

(Toner Resistance Rt)

A toner resistance Rt is measured by using a dielectric loss measurement device (trade name: TR-10C type, manufactured by Ando Electric Co., Ltd.) as follows. In addition, as an oscillator a WBG-9 type (trade name, manufactured by Ando Electric Co., Ltd.), as an equilibrium position detector a BDA-9 type (trade name, manufactured by Ando Electric Co., Ltd.), as a constant-temperature oven a TO-19 type (trade name, manufactured by Ando Electric Co., Ltd.), and as a solid electrode a SE-70 type (tradename, manufactured by Ando Electric Co., Ltd.) are used, respectively. An effective electrode area A of the solid electrode is approximately 2.83 $(0.952\pi)$ cm$^2$.

A tablet is formed from toner of 1 g by using a tablet forming machine, and is used as a measurement sample. Conductance is measured using this measurement sample as follows. First, as a zero equilibrium operation, conductance is adjusted to a predetermined value. A conductance value at this time is taken as $R_0$. Next, the measurement sample obtained is placed at a center of the solid electrode, and is then nipped with a guard electrode. A frequency of the oscillator is set to 1 kHz, and a voltage of 10 V is applied between the electrodes. After it takes 15 minutes since a voltage has been started to be applied between the electrodes, conductance is measured. Conductance to be measured at this time is taken as R'. After the measurement is completed, a thickness of the measurement sample is measured at a center point, and four circumference portions, and an average value of these values is obtained to be taken as Tx.

The toner resistance Rt is calculated from the following expression.

$$Rt=10A/(Gx\times Tx)$$

"Gx" represents conductance calculated from the following expression.

$$Gx=\text{RATIO value}\times(R'-R_0)$$

"RATIO value" represents a constant value defined with respect to each measurement frequency when measuring. Here, the measurement frequency is 1 kHz, and the corresponding RATIO value is $1\times10^{-9}$.

Production Example 1

[Preparation of Coarse Particle Slurry]

In the beginning, 87.5 parts of polyester resin (glass transition temperature Tg: 60° C., softening temperature Tm: 110° C.), 1.5 parts of a charge controller (trade name: TRH, produced by Hodogaya Chemical Co., Ltd.), 3 parts of polyester wax (melting temperature: 85° C.) and 8 parts of a colorant (KET. BLUE 111) were mixed in a mixer (trade name: Henschel Mixer, produced by Mitsui Mining Co., Ltd.). An obtained mixture was melt-kneaded at a cylinder temperature of 145° C. and the number of barrel rotations of 300 rpm by use of a bi-axis extruder (trade name: PCM-30, produced by Ikegai Corp.) to prepare a melt-kneaded material of toner raw materials. The melt kneaded material, after cooled to room temperature, was roughly crushed by use of a cutter mill (trade name: VM-16, produced by Seishin Enterprise Co., Ltd.) to prepare coarse particles having particle diameters of 100 μm or less. In the next place, 40 g of the coarse particles, 13.3 g of xanthan gum, 4 g of sodium dodecylbenzene sulfonate (trade name: Runox S-100, anionic dispersant, produced by Toho Chemical Industry Co., Ltd.), 0.67 g of sulfosuccinate surfactant (trade name: airroll CT-1p, main component: sodium dioctyl sulfosuccinate, produced by Toho Chemical Industry Co., Ltd.) and 742 g of water were mixed, an obtained mixture was put in a mixer (trade name: New Generation Mixer NGM-1.5TL, produced by Beryu Corp.), agitated at 2000 rpm for 5 min, followed by deaerating, and thereby coarse particle slurry was prepared.

Example 1

[Preparation of Aqueous Slurry of Resin Fine Particles]

Into a tank of a high-pressure homogenizer (trade name: NANO3000, produced by Beryu Corp.), 800 g of the above obtained coarse particle slurry was put in and circulated in the high-pressure homogenizer for 40 min at a temperature of 120° C. or more and under pressure of 210 MPa, and thereby resin fine particle slurry containing resin fine particles having a volume average particle diameter of 2.5 μm was prepared. The high-pressure homogenizer used here is a high-pressure homogenizer 1 for pulverization use shown in FIG. 3. At this time, at a pressure unit 4, the coarse particle slurry was pressurized under 210 MPa. The heater 5 was used to heat to 120° C. or more. A coiled piping in the heater 5 had a coil inner diameter of 4.0 mm, a coil radius (coil curvature radius) of 40 mm, 50 windings, a pitch angle of 15°, a ½ coil pitch of 23 mm, and an entire length of coil of 26105 mm. As the pulverizing nozzle 6, a nozzle having a nozzle length of 0.4 mm and a flow path having a diameter of 0.09 mm and penetrating through in a longer direction was used. As the depressurizing module 7, a pressure-proof nozzle 20 shown in FIG. 5 was used. In the example, a nozzle was 150 mm in length, 2.5 mm in inlet diameter, and 0.3 mm in outlet diameter.

[Production of Aggregated Particles]

Into a mixer (tradename: New Generation Mixer NGM-1.5TL), 800 g of the resin fine particle slurry and 10 g of a 20%-aqueous solution of stearyl trimethyl ammonium chloride (trade name: Coatamine 86W, produced by Kao Corp.) were put, followed by agitating at 2000 rpm for 5 min, further followed by deaerating, thereby preparing the aqueous slurry of resin fine particles containing a cationic dispersant. An entirety of the resin fine particle slurry was put in a tank of a high-pressure homogenizer, the aqueous slurry of resin fine particles was circulated in the high-pressure homogenizer under heating at 70° C. and under pressure of 13 MPa for 40 min, thereby slurry containing aggregated particle was prepared. The high-pressure homogenizer used here is a high-pressure homogenizer 40 for particle aggregation use which is obtained by partially modifying a high-pressure homogenizer (trade name: NANO 3000, produced by Beryu Corp.) and which is shown in FIG. 12. A coiled piping in the heater 5 is the same as that used in the high-pressure homogenizer 1 for pulverization use employed above. The first coil piping 37 had a coil curvature radius of 38 mm, 54 windings, a coil angle of 15°, a ½ coil pitch of 22 mm, and a length of 26784 mm. The second coil piping 40 had a coil curvature radius of 38 mm, 27 windings, a coil angle of 15°, a ½ coil pitch of 38 mm, and a length of 13392 mm. As depressurizing modules 36, 38, 39 and 42, a depressurizing nozzle 30 shown in FIG. 10 was used. In the embodiment, the nozzle was 150 mm in length, 0.3 mm in inlet diameter, and 2.5 mm in outlet diameter.

The above-obtained aggregated particle slurry was filtrated to take out aggregated particles, followed by water washing 5 times, further followed by drying the aggregated particles with hot air heated at 75° C., and thereby aggregated particles of the invention were prepared.

Example 2

Aggregated particles were manufactured in the same manner as Example 1 except that, in manufacturing the aggregating particles, applied pressure was changed from 13 MPa to 70 MPa and the circulation time was changed from 40 min to 25 min.

Example 3

Aggregated particles were manufactured in the same manner as Example 1 except that, in manufacturing the aggregated particles, the circulation time was changed from 40 min to 3 min.

Example 4

[Preparation of Aqueous Slurry of Resin Fine Particles]

Aqueous slurry of resin fine particles containing resin fine particles whose volume average particle diameter was 0.5 μm, was prepared in the same manner as Example 1 except that, in preparing the aqueous slurry of resin fine particles, a temperature maintained inside the high-pressure homogenizer (a holding temperature) was changed from 120° C. or more to 160° C. or more, applied pressure was changed from 210 MPa to 168 MPa, and the circulation time was changed from 40 min to 20 min

[Production of Aggregated Particles]

Aggregated particles were manufactured in the same manner as Example 1 except that the aqueous slurry of resin fine particles was changed from the slurry obtained in Example 1 to the slurry obtained above, 10 g of a 20%-aqueous solution of stearyl trimethyl ammonium chloride (trade name: Coatamine 86W) was changed to 13.3 g of a 30%-aqueous solution, and applied pressure was changed from 13 MPa to 35 MPa.

Example 5

Figure 11:
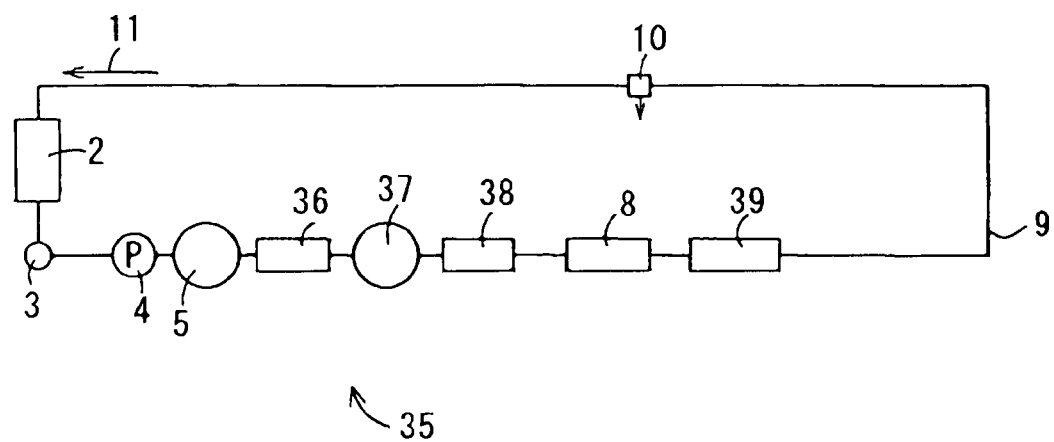
FIG. 11 is a system diagram schematically showing a configuration of a high-pressure homogenizer for aggregation use.

Aggregated particles were manufactured in the same manner as Example 4 except that in place of the high-pressure homogenizer 40 for particle aggregation use shown in FIG. 12, a high-pressure homogenizer 35 shown in FIG. 11 was used.

Example 6

Aggregated particles were manufactured in the same manner as Example 1 except that the first coiled piping 37 was changed from 38 mm to 60 mm in the coil curvature radius and from 54 to 34 in the number of windings while the second coiled piping 41 was changed from 38 mm to 60 mm in the coil curvature radius and from 27 to 17 in the number of windings.

Example 7

Aggregated particles were manufactured in the same manner as Example 6 except that the first coiled piping 37 was kept warm in a thermostatic chamber of 80° C. and the second coiled piping 41 was cooled by tap water so that the resin fine particles were aggregated.

Example 8

Aggregated particles were manufactured in the same manner as Example 4 except that the circulation time in manufacturing the aqueous slurry of resin fine particles was changed from 20 min to 10 min. A volume average particle diameter of the resin fine particles was 0.3 μm.

Example 9

Aggregated particles were manufactured in the same manner as Example 1 except that the circulation time in manufacturing the aqueous slurry of resin fine particles was changed from 40 min to 80 min. A volume average particle diameter of the resin fine particles was 3.3 μm.

Example 10

Aggregated particles were manufactured in the same manner as Example 1 except that an aqueous slurry of resin fine particles was prepared by treating 800 g of the coarse particle slurry obtained in the production example 1 twice in a beadsless disperser: Filmics (trade name) manufactured by PRIMIX Corporation at 50 m/s for five min.

Example 11

Aggregated particles were manufactured in the same manner as Example 4 except that the number of coil windings of the coiled piping in the heater 5 was changed from 50 to 190, the coil curvature radius from 40 mm to 27 mm, the number of coil windings of the first coiled piping 37 from 54 to 190, the coil curvature radius from 38 mm to 27 mm, the number of coil windings of the second coiled piping 41 from 27 to 190, and the coil curvature radius from 38 mm to 27 mm.

Example 12

Aggregated particles were manufactured in the same manner as Example 11 except that the coil curvature radius of the coiled piping in the heater 5 was changed from 40 mm to 190 mm, the coil curvature radius of the first coiled piping 37 from 27 mm to 190 mm, and the coil curvature radius of the second coiled piping 41 from 27 mm to 190 mm.

Example 13

Aggregated particles were manufactured in the same manner as Example 11 except that the coil curvature radius of the coiled piping in the heater 5 was changed from 40 mm to 24 mm, the coil curvature radius of the first coiled piping 37 from 27 mm to 24 mm, and the coil curvature radius of the second coiled piping 41 from 27 mm to 24 mm.

Example 14

Aggregated particles were manufactured in the same manner as Example 11 except that the coil curvature radius of the coiled piping in the heater 5 was changed from 40 mm to 205 mm, the coil curvature radius of the first coiled piping 37 from 27 mm to 205 mm, and the coil curvature radius of the second coiled piping 41 from 27 mm to 205 mm, Example 15

Aggregated particles were manufactured in the same manner as Example 11 except that the number of coil windings of the coiled piping in the heater 5 was changed from 50 to 210, the number of coil windings of the first coiled piping 37 from 190 to 210, and the number of coil windings of the second coiled piping 41 from 190 to 210.

Example 16

Aggregated particles were manufactured in the same manner as Example 15 except that the coil curvature radius of the coiled piping in the heater 5 was changed from 40 mm to 24 mm, the coil curvature radius of the first coiled piping 37 from 27 mm to 24 mm, and the coil curvature radius of the second coiled piping 41 from 27 mm to 24 mm.

Example 17

Aggregated particles were manufactured in the same manner as Example 15 except that the coil curvature radius of the coiled piping in the heater 5 was changed from 40 mm to 205 mm, the coil curvature radius of the first coiled piping 37 from 27 mm to 205 mm, and the coil curvature radius of the second coiled piping 41 from 27 mm to 205 mm.

Comparative Example 1

Aggregated particles for comparison were manufactured in the same manner as Example 4 except that the high-pressure homogenizer 40 for particle aggregation use shown in FIG. 12 was replaced by a high-pressure homogenizer which was obtained by remodeling the high-pressure homogenizer 40 for particle aggregation use shown in FIG. 12 so that the second coiled piping 37, the third coiled piping 41, the second depressurizing module 38 and the third depressurizing module 42 are not included while the first depressurizing module 36 and the cooler 8 are directly connected to each other.

Comparative Example 2

Aggregated particles for comparison were manufactured in the same manner as Example 1 except that in the resin fine particle-containing aqueous slurry preparing step and the aggregating step, the coiled piping in the heater 5 was replaced by a linear piping composed of a linearly-formed pipe-like member whose entire length of the coil and coil radius were the same as those of the coiled piping used in Example 1.

Volume average particle diameters (μm), coefficients of variation (CV values) and toner resistances Rts of aggregated particles obtained in Examples 1 through 17 and Comparative examples 1 and 2 are shown in Table 1.

TABLE 1

| | Volume average particle diameter μm | Coefficient of variation CV value | Toner resistance Rt ($\times 10^8$ Ω) |
|---|---|---|---|
| Example 1 | 5.1 | 28 | 151 |
| Example 2 | 6.7 | 28 | 121 |
| Example 3 | 4.9 | 29 | 166 |
| Example 4 | 3.7 | 27 | 171 |
| Example 5 | 3.4 | 29 | 178 |
| Example 6 | 4.9 | 25 | 163 |
| Example 7 | 5.2 | 21 | 150 |
| Example 8 | 3.5 | 29 | 175 |
| Example 9 | 6.9 | 24 | 136 |
| Example 10 | 5.8 | 35 | 145 |
| Example 11 | 6.8 | 23 | 134 |
| Example 12 | 3.5 | 31 | 168 |
| Example 13 | 7.3 | 29 | 112 |
| Example 14 | 2.9 | 37 | 176 |
| Example 15 | 7.2 | 25 | 111 |
| Example 16 | 7.6 | 34 | 83 |
| Example 17 | 2.6 | 39 | 182 |
| Comparative Example 1 | 6.0 | 44 | 135 |
| Comparative Example 2 | 2.0 | 46 | 178 |

From Table 1, it is obvious that, according to the invention, aggregated particles can be obtained which has a volume average particle diameter in the range of 3 μm to 7 μm with a small coefficient of variation in the range of 27 to 29 and which are homogeneous in shape.

According to the toner manufactured in accordance with the invention, components contained in an inside of a toner particle are uniformly dispersed. Accordingly, although, compared to a general toner, the toner according to the invention has high concentration of the conductive substance, for example, a colorant to a toner raw material and is manufactured using a dispersant that is a conductive substance, the toner according to the invention exhibits relatively-high resistance. In addition, depending on a small particle diameter of the toner particle, a surface area of the toner particles is totally large and a fusion surface of the toner particles is small. Accordingly, the smaller the particle diameter of the toner particles, the larger the ratio of an amount of the conductive substance that contacts water in washing, to the total amount thereof, and accordingly an amount of the conductive substance that increases. Accordingly an amount of the conductive substance confined in the toner particles is reduced, and its resistance relatively becomes high. As an example of the general toner, the volume average particle diameter of 5.5 μm, the coefficient of variation of 22%, and the resistance of 107 $\times 10^9$ Ω are given. In the case of the toner particle having a similar particle diameter to that of the general toner, the toner manufactured according to the invention has higher resistance and can lead to easy control in charge of the toner. Further, in the toner manufactured according to the invention, the toner raw material is sufficiently kneaded by a kneader in advance and the toner is granulated while the sufficiently-kneaded state is kept. Accordingly, even if the toner is manufactured under any condition after kneading, the resistance hardly changes.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A method of manufacturing aggregated particles, comprising:
    an aggregating step of obtaining an aqueous slurry of aggregated particles by flowing an aqueous slurry of resin fine particles down through a coiled piping under heat and pressure;
    a depressurizing step of depressurizing the aqueous slurry of aggregated particles in order to remove bubbles from surfaces of the aggregated particles in the aqueous slurry; and a cooling step of cooling the aqueous slurry of aggregated particles.

2. The method of claim 1, wherein a volume average particle diameter of the resin fine particles is in the range of 0.4 μm to 3 μm.

3. The method of claim 1, comprising, before the aggregating step, a resin fine particle-containing aqueous slurry preparing step of preparing the aqueous slurry of resin fine particles through a high-pressure homogenizer process.

4. The method of claim 3, wherein the resin fine particle-containing aqueous slurry includes a pulverizing stage of obtaining an aqueous slurry that contains resin fine particles having particle diameters of 3 μm or less, in which stage an aqueous slurry of coarse particles of synthetic resin or synthetic resin containing a colorant and a mold releaser is made to pass through a pressure-proof nozzle under heat and pressure to pulverize the coarse particles.

5. The method of claim 1, wherein the depressurizing step is carried out by flowing the aqueous slurry of aggregated particles down through a depressurizing nozzle.

6. The method of claim 1, wherein the coiled piping is wound 1 to 200 times and a coil radius is in the range of 25 mm to 200 mm.

7. The method of claim 1, wherein the aggregating step is carried out under heat at a temperature in a range from a glass transition temperature to a softening temperature of the resin fine particles and under pressure in a range of 5 MPa to 100 MPa.

* * * * *